US007814018B1

(12) United States Patent
Sosa et al.

(10) Patent No.: US 7,814,018 B1
(45) Date of Patent: Oct. 12, 2010

(54) CHARGE NUMBER ISSUING AND TRANSACTION SYSTEM AND METHOD

(75) Inventors: Rogelio Sosa, Travis County, TX (US); Bertrand Sosa, Travis County, TX (US)

(73) Assignee: Netspend Corporation, Austin, TX (US)

( * ) Notice: Subject to any disclaimer, the term of this patent is extended or adjusted under 35 U.S.C. 154(b) by 2106 days.

(21) Appl. No.: 09/662,222

(22) Filed: Sep. 14, 2000

Related U.S. Application Data

(63) Continuation-in-part of application No. 09/493,886, filed on Jan. 28, 2000, now abandoned, which is a continuation-in-part of application No. 09/384,581, filed on Aug. 27, 1999, now abandoned.

(51) Int. Cl.
*G06Q 40/00* (2006.01)

(52) U.S. Cl. ....................................................... 705/43

(58) Field of Classification Search .................. 705/35, 705/39, 44, 28, 41, 1, 26, 43, 65; 235/380
See application file for complete search history.

(56) References Cited

U.S. PATENT DOCUMENTS

| 3,943,335 | A | * | 3/1976 | Kinker et al. ................ 235/379 |
| 5,577,109 | A | * | 11/1996 | Stimson et al. ............ 379/114.2 |
| 5,696,908 | A | | 12/1997 | Muehlberger et al. |
| 5,850,442 | A | * | 12/1998 | Muftic ........................... 705/65 |
| 5,956,699 | A | * | 9/1999 | Wong et al. .................... 705/39 |
| 6,000,608 | A | * | 12/1999 | Dorf ............................ 235/380 |
| 6,000,832 | A | * | 12/1999 | Franklin et al. ............. 700/232 |
| 6,002,767 | A | | 12/1999 | Kramer |
| 6,014,650 | A | * | 1/2000 | Zampese ....................... 705/44 |
| 6,065,675 | A | * | 5/2000 | Teicher ........................ 235/380 |
| 6,105,863 | A | * | 8/2000 | Jagadish et al. ............. 235/379 |
| 6,173,269 | B1 | | 1/2001 | Solokl et al. |
| 6,189,787 | B1 | | 2/2001 | Dorf |

(Continued)

FOREIGN PATENT DOCUMENTS

JP 410149396 A * 6/1996

OTHER PUBLICATIONS

Newsbytes, pN/A; "Virtual Mall Opens in Cyberspace Jun. 20, 1994"; Jun. 20, 1994; Newswire; General Trade; Dialog No. 03429388; pp. 1-2.*

(Continued)

*Primary Examiner*—Ella Colbert
(74) *Attorney, Agent, or Firm*—Baker Botts L.L.P.

(57) ABSTRACT

A charge number issuing and transaction system providing a universally acceptable, anonymous and secure payment option. An issuing and transaction system receives a bin of valid purchase numbers from an issuing bank, establishes a prepaid cash account for a user, detects a request for a charge number by the user, and provides a valid purchase number via a computer or telephonic network. The user may then consummate a pending transaction or a subsequent transaction via the network using the provided purchase number. The transaction is cleared through a charge settlement network. The issuing and transaction system may be pre-certified as processor for the purchase numbers, where the charge settlement network routes the purchase transaction back to the issuing and transaction system for verification, authorization and settlement. The issuing and transaction system may generate and provide a valid expiration date and may further expire each purchase number after being used.

43 Claims, 9 Drawing Sheets

U.S. PATENT DOCUMENTS

| | | | |
|---|---|---|---|
| 6,227,447 B1 * | 5/2001 | Campisano | 235/380 |
| 6,247,047 B1 * | 6/2001 | Wolff | 709/219 |
| 6,267,292 B1 * | 7/2001 | Walker et al. | 235/379 |
| 6,324,523 B1 * | 11/2001 | Killeen et al. | 705/35 |
| 6,343,279 B1 * | 1/2002 | Bissonette et al. | 705/41 |
| 6,351,739 B1 * | 2/2002 | Egendorf | 705/40 |
| 6,456,984 B1 * | 9/2002 | Demoff et al. | 705/40 |
| 6,505,171 B1 * | 1/2003 | Cohen et al. | 705/26 |
| 6,520,409 B1 * | 2/2003 | Mori et al. | 235/380 |
| 6,575,361 B1 * | 6/2003 | Graves et al. | 235/380 |
| 6,609,113 B1 * | 8/2003 | O'Leary et al. | 705/39 |
| 6,675,153 B1 * | 1/2004 | Cook et al. | 705/74 |
| 2003/0028481 A1 * | 2/2003 | Flitcroft et al. | 705/39 |

OTHER PUBLICATIONS

Anonymous, Virtual Mall Opens in Cyberspace, Jun. 20, 1994, Newsbytes.

* cited by examiner

CHARGE NUMBER ISSUING AND TRANSACTION SYSTEM AND METHOD

CROSS-REFERENCE TO RELATED APPLICATIONS

The present application is a continuation-in-part of U.S. patent application entitled "An Online Cash System Using Charge Numbers", Ser. No. 09/493,886, filed Jan. 28, 2000, which itself is a continuation-in-part of U.S. Patent Application entitled "Prepaid Card Based Internet and Merchandiser Sales and Advertising System", Ser. No. 09/384,581, filed Aug. 27, 1999, both of which are incorporated herein by reference in their entirety and made part of the present application. The present application is also related to U.S. Patent Application entitled "A Transaction System And Method Using Cash Cards and a Charge Settlement Network", Ser. No. 09/661,724, filed concurrently herewith, now abandoned.

FIELD OF THE INVENTION

The present invention relates to e-commerce, and more particularly, to a charge number issuing system and method that provides a universally-accessible, anonymous and secure online payment option for users and consumers.

DESCRIPTION OF RELATED ART

The explosion of the Internet has led to new methods of doing business generally referred to as electronic commerce or "e-commerce". E-commerce has become fairly common and involves many types of online transactions over an electronic communications network, such as the Internet or any other global network, including business-to-business, business-to-consumer, business-to-government and similar type transactions. Consumers can shop for and purchase goods and services online without leaving the home or the computer. In the consumer world, the primary method of conducting purchases is the use of a credit or debit card, otherwise referred to as a charge card. The consumer provides the charge number and expiration date and any other information that may be required such as name and address, etc. on a purchase page from an online merchant. The online merchant clears or verifies the charge information, either during the immediate transaction or at a later time, and settles the purchase upon verification. For example, the merchant may settle the transaction via a charge settlement network, such as the electronic funds transfer (EFT) network or the automated clearinghouse (ACH) network or the like. The ACH network is a nationwide payment and collection system that provides for the electronic distribution and settlement of funds.

Other billing methods have been used such as mail delivery or cash on delivery (COD), but these other methods are more costly and are certainly not as convenient for both merchants and consumers. Methods of billing by mail or COD are limited and are not satisfactory for various reasons, including lack of convenience and potential lack of anonymity. The e-wallet technique is becoming more popular, but is still credit-based and requires a valid charge account.

There are many people who choose not to have a charge card for various reasons yet desire the convenience that credit cards offer. There are many people who are unable to obtain a charge card, such as under-aged individuals or those with poor credit or financial histories. There are many people who have credit cards but want their credit numbers and their personal information to remain confidential, and yet still desire the convenience of e-commerce. The use of a charge card precludes anonymity and confidentiality since the merchant verifies the account through the sponsor of the charge card and therefore has access to the identity of the purchaser. There are many people who are concerned, for good reason, that online use of a personal charge or credit number may not be secure. Cybertheft continues to pose a significant threat to online merchants and e-commerce in general. Unauthorized intruders often breach the security measures of a web site and steal otherwise valid credit card information. Such compromised credit accounts may be used to conduct illicit and unauthorized purchase transactions resulting in increased cost to merchants and consumers. Although security measures are improving, hackers are often one step ahead and continue to impede the full potential of e-commerce.

It is desired to provide the convenience of charge cards for conducting purchases over the Internet or a telephonic network to those people who have the necessary funds or cash but who cannot or would rather not use charge cards. It is further desired to maintain or even enhance cash management convenience afforded by debit cards and automated teller machines (ATM). It is further desired to improve security of purchase transactions, including online and/or telephonic transactions, and reduce or otherwise eliminate the potential of credit theft and fraud and to provide worry-free e-commerce.

SUMMARY OF THE INVENTION

A charge number issuing system and method that provides a universally acceptable, anonymous and secure payment option for users and consumers. A method of issuing charge numbers using an electronic communications network in accordance with an embodiment of the present invention includes detecting a request by a user via the electronic communications network for a valid charge number, selecting one of a plurality of valid charge numbers, and providing the selected valid charge number via the electronic communications network in response to the request. The electronic communications network includes a computer communications network, such as the Internet or the like, or a telephonic network. The request may be in the form of detecting an online purchase transaction, but it need not be. The user may request a valid purchase number directly via the computer communications network or the telephonic network. The valid charge number may be provided to the user or to an online merchant to consummate an online purchase transaction. The user may use the valid charge number to conduct a telephonic purchase, such as standard mail order purchases by telephone. It is appreciated that the issuing system provides a valid charge number so that the user can purchase goods or services through the electronic communications network, such as the Internet or the like or using a telephone, without having a credit or debit account. The user may consummate a current transaction or utilize the valid charge number for a subsequent transaction.

The method may include receiving the valid charge numbers from an issuing bank and storing the numbers by the issuing system. In a particular embodiment, the issuing system receives a bin or group of valid charge numbers from a sponsoring or issuing bank. The valid charge numbers are new and unique in that they are not associated with any particular user or consumer upon issuance other than the issuing system itself. The charge numbers are issued to an individual or business entity associated with the issuing system and used by the issuing system to enable purchase transactions. The charge numbers are valid in that they are in the same format as universally-accepted credit or debit numbers such as those commonly used or licensed by VISA, MasterCard, American Express, Discover, etc. In this manner, the user does not need to provide a credit card to purchase goods or services either online or by phone.

The method may further include detecting, by the issuing system via a charge settlement network, the selected valid charge number used to consummate a purchase transaction and expiring the selected valid charge number employed to consummate the purchase transaction. In this manner, the issuing system may expire each of the charge numbers used to consummate corresponding purchase transactions. For example, a selected charge number is used once and then expired to an expired database. In this manner, security is vastly improved in that the same charge number is not employed for subsequent transactions as is common for credit card numbers.

The method may include clearing, by a merchant, a purchase transaction via a charge settlement network, settling, by a merchant processor associated with the merchant, the purchase transaction through the charge settlement network, and deducting, by the merchant processor, a merchant discount for the merchant. The method may further include routing, by a switch network of the charge settlement network, the selected valid charge number to a predetermined processor for the plurality of valid charge numbers. In yet another embodiment, the issuing system is pre-certified as processor for its issued valid charge numbers. If the issuing system is pre-certified by an issuing bank as the processor for the valid charge numbers, then the switch network routes any of the valid charge numbers in the charge settlement network to the issuing system. The charge settlement network may include the electronic funds transfer (EFT) network or the automated clearing house (ACH) network or the like. For example, a switch network of the charge settlement network is provided with a copy of the valid charge numbers and routes the valid charge numbers to the issuing system as processor. In this manner, when any merchant clears a purchase transaction through the charge settlement network in conjunction with the purchase transaction, the same issuing system that provided the valid charge number also operates as the processor for the number.

The method may include establishing, by the issuing system, a prepaid cash account for the user, detecting a purchase transaction between the user and a merchant via the charge settlement network using the selected valid charge number and processing the purchase transaction by the issuing system. The processing may include verifying that a charge number received via the charge settlement network is the same as the selected valid charge number provided via the electronic communications network. The method may further include generating, by the issuing system, a valid expiration date corresponding to the selected valid charge number and providing the corresponding valid expiration date with the selected valid charge number. The processing may further include verifying that an expiration date received via the charge settlement network is the same as the corresponding valid expiration date provided with the valid charge number. Processing of the expiration date is not necessarily an expiration determination and may simply be an equivalence determination. The processing may further include comparing a purchase amount received via the charge settlement network with a corresponding cash balance of the prepaid cash account and authorizing the transaction if the cash balance of the prepaid cash account is sufficient for a purchase amount of the purchase transaction. The authorizing may comprise returning authorization information via the charge settlement network to a clearing entity.

The issuing system authorizes and settles each of a plurality of purchase transactions in a similar manner. Upon a certain number of transactions or periodically, the issuing system sends a plurality of settled transactions to the issuing or sponsoring bank via an ACH batch transfer or the like. The sponsoring bank then settles the purchase transactions as desired.

In one embodiment, the issuing system establishes an electronic mail account that enables communication between an online merchant and the user. More particularly, the issuing system may generate an email address linked to a prepaid cash account associated with the user and provide the email address to an online merchant during a purchase transaction. The email address need not identify the user and may be computer generated. In one embodiment, an email processor cooperates with an email database at the issuing system to establish the email account. The merchant may send an email using the provided email address, which is received and stored by the issuing system. The issuing system notifies the user when accessing the cash account, such as by an email icon or the like, so that the user may open and review the email through the issuing system. The user may reply back to the merchant using the merchant's email address. The user remains anonymous and confidential user information is not provided to the merchant. Of course, the user may directly contact the merchant to resolve any issues if desired.

A charge number issuing system for issuing valid charge numbers via a electronic communications network in accordance with an embodiment of the present invention includes a storage device that stores the valid charge numbers, a network system for coupling to and enabling communications with the electronic communications network, and a transaction system. The network system may include a computer network communications system for interfacing a computer communications network and a telephonic communications system for interfacing a telephonic network. The transaction system detects a request by a user for a charge number via the electronic communications network and provides a selected valid charge number via the electronic communications network in response to the request. Again, the charge number may be provided directly to the user via a computer communications network or a telephonic network, or may be provided to a merchant to consummate an online purchase transaction. The issuing system may further include a processor system that enables communications with the charge settlement network and that processes transactions utilizing any of the valid charge numbers entered for clearance via the charge settlement network in a similar manner as previously described. The charge settlement network may comprise the EFT network or the like.

The storage device may store an accounts database including at least one prepaid cash account associated with a user. In one embodiment, the transaction system is configured to authorize a purchase transaction if a cash balance in a prepaid cash account associated with the user is sufficient to cover a purchase amount of the purchase transaction submitted via the charge settlement network. The transaction system may further be configured to generate a valid expiration date to correspond with the selected valid charge number and to provide the corresponding valid expiration date with the selected valid charge number via the electronic communications network. The transaction system may be further configured to verify that an expiration date received via the charge settlement network is the same as the valid expiration date corresponding to the selected valid charge number. The processor system is configured to return authorization information via the charge settlement network if the purchase transaction is approved.

The issuing system may further include an expired charge number data stored by the storage device. The transaction system expires valid charge numbers into the expired purchase database after authorizing corresponding purchase transactions. The issuing system may further include an electronic mail system that enables email communication between the user and an online merchant. The electronic mail system may further include an email processor that generates email addresses and that provides the generated email addresses to online merchants. The electronic mail system may further include an email database that stores the generated email addresses. The electronic mail system may further associate one or more email addresses to any one or more prepaid cash accounts of any user.

A charge number issuing and processing system for issuing valid charge numbers via a electronic communications network and for processing the valid charge numbers via a charge settlement network according to an embodiment of the present invention includes an issuing system and a switch network that routes any of the plurality of valid charge numbers entered into the charge settlement network to the issuing system for processing. The issuing system includes the storage device, a communication system for coupling to and enabling communications with the electronic communications network, the transaction system, and the processor system, each configured in a similar manner as previously described.

It is appreciated that the present invention provides the convenience of charge cards for conducting purchases over the Internet or by telephone to those people who have the necessary funds or cash but who cannot or otherwise desire not to use charge cards. The present invention further enables improved security of purchase transactions and reduces or otherwise eliminates the potential of credit theft and fraud and provides worry-free e-commerce.

BRIEF DESCRIPTION OF THE DRAWINGS

A better understanding of the present invention can be obtained when the following detailed description of the preferred embodiment is considered in conjunction with the following drawings, in which.

Figure 1:
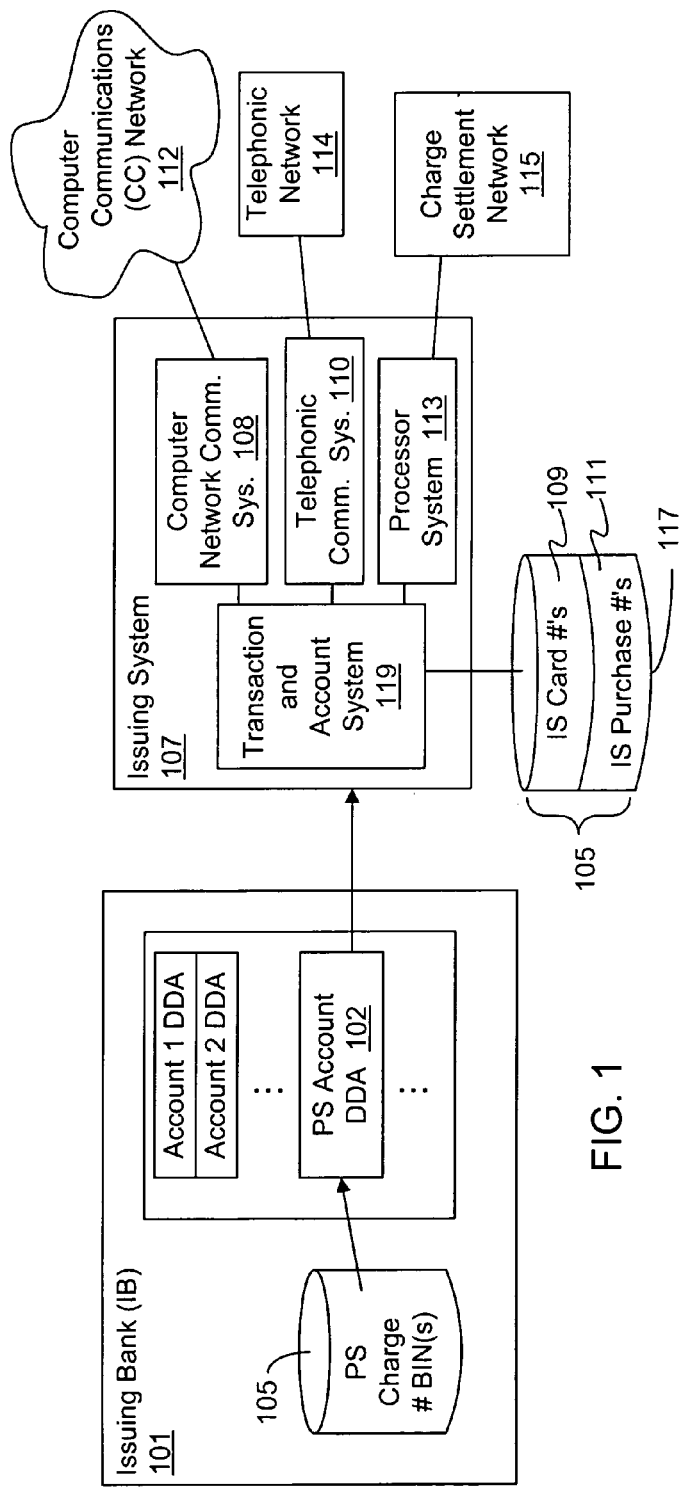
FIG. 1 is a block diagram illustrating an exemplary embodiment of charge number distribution from an issuing or sponsoring bank and corresponding application.

DETAILED DESCRIPTION OF
EMBODIMENT(S) OF THE INVENTION

The term "computer communications network" is generally used herein to refer to networks established between computers or the like, such as a local area network (LAN), a wide area network (WAN), etc., and further encompasses the interconnection or inter-coupling of such networks such as comprises the Internet including the Internet backbone and other networks that enable global computer communications. Although the Internet is often thought of as a public network, it also encompasses private networks and Virtual Private Networks (VPN) configured within a public network. Computer communications network also encompasses "in-house" LANs or web sites within a company or the like, and extranets open to customers and the like. The term "computer communications network" also incorporates wireless technology, such as wireless LANs (WLAN), wireless modems, and any other wireless extensions of computer related networks.

The term "telephonic network" generally contemplates the telephone industry and technology in general including the Public Switched Telephone Network (PSTN) and other similar type networks and technology. The telephonic network includes communications between phones, phone systems, facsimile machines, modems, computers, pagers, cellular telephones, etc. As described further below, the term telephonic network also encompasses wireless and cellular telephony and technology and related concepts.

It is further recognized that there is significant overlap in the concepts of computer communications networks and telephonic networks, such as, for example, connection to the Internet via a telephonic modem or the like. Also, much of the Internet is implemented using telephonic networks throughout the world. The term "electronic communications network" contemplates any public and/or private communications network that enables communication between people or devices over a broad area and even worldwide, such as the Internet or the like, and is intended to encompass both computer communications and telephonic networks and related concepts and technology. The term "online" generally connotes communication activities utilizing a computer communications network, such as, for example, utilizing a computer with browser software or the like via the Internet, but also encompasses similar activities utilizing the telephonic network and telephonic devices. The term "electronic communications network" also encompasses all related wireless communications concepts associated with computer communications networks and telephonic networks and otherwise.

The term "charge settlement network" refers to any system or network that is employed by online and/or brick and mortar merchants or the like to authorize, clear, settle, etc. transactions being conducted in association with charge numbers, such as standard debit or credit numbers provided on charge cards. A charge settlement network enables any transfer of funds initiated through an electronic terminal, telephone, computer or magnetic tape, and transfers made at automated teller machines (ATM) and point-of-sale (POS) terminals. For example, brick and mortar merchants typically include a validation unit or card reader or the like for reading encoded charge numbers on magnetic strips on charge cards or the like. The charge card is swiped in the card reader during a purchase transaction or the like, where the card reader reads and forwards the retrieved charge number to an authorized or certified processor for the charge number to clear and/or settle the transaction. Online merchants transmit valid charge numbers electronically to a charge settlement network to clear transactions. A charge number may also be conveyed over a telephonic network to consummate a transaction, where the receiving merchant verifies the number via a charge settlement network to clear the transaction. The term "charge settlement network" encompasses any existing electronic networks, such as the Electronic Funds Transfer (EFT) network, the Automated Clearing House (ACH) network, etc. The ACH network is a nationwide payment and collection system that provides for the electronic distribution and settlement of funds. It is noted that a charge settlement network is often viewed as a private network. It is understood, however, that a charge settlement network may be implemented on any type of electronic communications network including computer communications and telephonic networks.

In prior disclosures, an online cash system was disclosed that enables consumers to purchase goods and services online via an electronic communications network, such as the Internet or the like. The prior disclosure is hereby incorporated by reference in its entirety and is briefly summarized herein. The online cash system provides a universally accessible, anonymous and secure online payment option via a proxy system. In general, a user or consumer purchases a cash card or the like from a receiving entity, such as an automated dispensing unit (ADU) with a validation unit, a clerk at a brick and mortar merchant, etc. The cash card is validated with a serial number at the receiving entity, where the validated cash card further enabled online activation of an online cash account with the proxy system.

The user establishes an online session with the proxy system, such as by entering a web address of the proxy system via a web browser or the like on the Internet, and the user then enters the serial number. The proxy system verifies the serial number and establishes an online cash account for the user with a cash balance in accordance with the amount of cash provided to the receiving entity. The user provides a user ID and password enabling subsequent access and usage of the cash account. Additional cash cards may be purchased to further fund existing accounts or to create new accounts. The user surfs a computer communications network, such as the Internet or the like, for online merchants or vendors for desired goods and services. When a purchase decision is made, the user invokes or otherwise activates the proxy system and accesses the purchase page of the merchant. The proxy system provides the necessary charge account information to the user or otherwise on behalf of the user, which may be conditioned on the balance in the cash account. If sufficient funds are available, the proxy system consummates the sale to the user and deducts the purchase price, along with any other fees, from the balance of the user's cash account. If the funds are insufficient, the proxy system simply rejects the purchase transaction. Many other capabilities were disclosed and all such information and functionality may be incorporated in systems described herein, which are extensions of the prior disclosure.

In embodiments of a charge number issuing system and method described herein, a charge number issuing system incorporates many of the same functions and operates in a similar manner as the proxy system previously described. The issuing system may operate as a proxy system for online purchase transactions or the like, and further facilitates issuing a charge number via a computer or telephonic network for subsequent purchases conducted via any type of electronic communications network. The charge information utilized by the issuing system includes a plurality of charge numbers issued by an issuing bank or financial institution. The issuing bank is a member of the Visa or MasterCard (MC) association of banks or the like, so that the charge numbers may be of the same format as standard, universally-accepted credit card numbers, such as Visa, MasterCard, American Express, etc. In this manner, the charge numbers may be utilized in existing charge settlement networks, such as the EFT network, the ACH network, etc. The issuing system further operates as a certified financial data processor for the charge numbers on behalf of the issuing bank. In this manner, during validation of any issuing system (IS) charge numbers via the charge settlement network, the transaction information is routed to the issuing system for verification and validation.

The IS charge numbers are further divided into card numbers and purchase numbers. Each card number is encoded onto a corresponding cash card, such as on the magnetic strip typically provided on "charge" cards, such as credit cards, debit cards, bank cards, etc. Each cash card may be configured in a similar manner as any typical charge card. The cash cards are then provided to brick and mortar merchants or distributors for sale to the public. A distributor is a merchant or vendor that distributes cash cards, although the term "distributor" also denotes a distributor of goods and/or related services. The cash cards may be utilized in a similar manner as cash cards previously described. In particular, each cash card includes a printed serial number for activation of an online cash account with the issuing system. Each cash card is first activated, however, by the distributor via the charge settlement network. For example, at the point of sale (POS) to the user, the cash card is swiped by a clerk into a card reader for activation. The information on the magnetic strip, including the card number, is forwarded via the charge settlement network to the issuing system as processor of the card number, which activates the cash card and the corresponding card number. Upon activation, the cash card with the card number may be used in a similar manner as a debit card. In one embodiment, the card number is not valid for any other transaction by itself, but is only valid in conjunction with a personal identification number (PIN), as described further below.

The purchaser of the activated cash card initiates a cash account online with the issuing system via a computer communications network or the like by entering the serial number printed on the card. The purchaser also provides a user ID and password to access the cash account for online purchases or other transactions, such as account transfers and the like. The user may provide other information, such as a PIN to be used in conjunction with the card number of the activated cash card, and a telephone number or the like for telephonic access and fund transfers. The issuing system associates the card number and the brick and mortar distributor from which the card was purchased with the cash account. The distributor is associated with locality information, such as any predetermined geographic area. A geographic area may be that particular store or distribution venue, a county, a city, a region, a state, a country, etc. The locality information may be static, such as a single distributing unit, or a group of distributors located within the geographic area, or may be dynamically determined, such as including certain distributors and merchants within a predetermined area or within a certain distance of the distributor that sold the cash card. In this manner, the cash account is associated with particular locality information based on where the card was purchased. The purchaser of the cash card, however, may remain anonymous since little or no personal information is collected by the distribution or the issuing system. It should be noted that even in the event where additional funds are added to the account by means of a bank transaction, all personal information would be stored separately and under a different encryption key. As an additional safeguard against potential security breaches of the database, the system may opt to discard, or not record the personal information of the user recharging the account.

Once the cash account is created or otherwise updated, the card number of the cash card is associated with the cash account. The cash card may be discarded in a similar manner as the cash cards previously described. In particular, the serial number is no longer valid and may not be used by another. Also, in one embodiment, the card number is not valid by itself and cannot be used apart from the card and the cash account PIN. Nonetheless, the cash card may be utilized to purchase goods and services and to access cash via a standard automated teller machine (ATM) in a similar manner as a debit or bank card as long as the cash card is utilized in conjunction with the PIN. For example, the user may use the cash card at an ATM to receive cash from the cash account by inserting the card and entering the PIN in a similar manner as a bank or debit card. Also, the user may use the cash card with the PIN at any merchant to purchase goods or services in a similar manner as a bank or debit card. In either case, the card information is routed to the issuing system as processor of the card number, where the issuing system verifies the card number contained in the magnetic stripe and PIN. If valid, the issuing system determines if the cash balance of the account is sufficient to cover the withdrawal or purchase amount in a similar manner as typical credit purchases. The account balance is adjusted and the transaction is approved if the card is valid and the funds are sufficient. Otherwise, the transaction is simply denied.

The association of the cash account with the distributor and the locality information provides a transdigital gateway that further enables transdigital advertising and/or marketing as further described below. The distributor that sold the card has access to the card purchaser via the issuing system for advertising, marketing and/or event notifications once the cash account is activated. The advertising, marketing and/or event notifications are provided to the issuing system, which displays the information to the purchaser when accessing the cash account online or otherwise when logged into the issuing system via the Internet or the like. Other merchants local to the original distributor may also access the purchaser via the issuing system based on the locality information determination. The purchaser remains anonymous, yet receives local advertising, marketing and/or event notifications and information without disclosing confidential information.

Online purchases are handled by the issuing system in a similar manner as by the proxy system previously described. In one embodiment, however, the issuing system operates as processor for the valid charge numbers and thus does not need to verify sufficient funds in a cash account before providing a purchase number online. Instead, the issuing system provides a unique and valid purchase number and verifies whether sufficient funds exist in an associated cash account when the purchase number is cleared via the charge settlement network. The issuing system uses each purchase number multiple times or for only one transaction in a similar manner as the proxy system. The single use embodiments provide enhanced security since each purchase number is expired after a single use. When a valid purchase number is provided, other charge information may be provided, such as a valid expiration date or the like. In one embodiment, the issuing system includes a transaction system that generates a valid expiration date that is provided along with the valid purchase number. The valid expiration date may be generated in any desired manner, such as randomly as long as within certain parameters to ensure acceptance by a merchant. For example, the expiration date is in the appropriate format and is a current or future date to be accepted. Otherwise, the particular date is not particularly of concern as the issuing system is the processor of the number, especially if the number is immediately expired after used to consummate a transaction.

The issuing system further enables providing a valid charge number via any type of electronic communications network, such as online via the Internet or via any type of telephonic network. The issuing system detects a request for a charge number. The request may be in the form of an online purchase transaction initiated by a user with an online merchant or the request may be directly from the user and not in conjunction with a purchase transaction. In one embodiment, the request may be received by telephone from a user via a telephonic network or the like. The issuing system includes a transaction and account system coupled to a telephonic communications system that interfaces the telephonic network to provide access and management of cash accounts by telephone. The transaction and account system further provides users with valid charge cards by telephone upon request. The user may utilize the valid card number for any purchase transaction via any type of electronic communications network, including any computer communications network or telephonic network.

The merchant forwards the information via the charge settlement network in a similar manner as any online or telephonic credit transaction. The charge information is routed to the issuing system as processor of the purchase number and any other charge information. Such provides a double security check for purchase transactions. The transaction is approved as long as the charge information received via the charge settlement network corresponds with the purchase transaction. For the single-use embodiments, once the purchase number is utilized to consummate a purchase transaction, the purchase number is "retired" and is no longer valid. An entirely new purchase number is used for any other transaction, including other transactions by the same purchaser or merchant. In this manner, an added level of security is achieved in that the purchase numbers may not be stolen and subsequently utilized to conduct illicit transactions. The issuing system, as processor, may further track any attempted use of a stolen purchase number which may ultimately lead to capture of the perpetrator.

The issuing system also establishes an electronic mail (email) service for enabling subsequent communication between the purchaser and the online merchant, while maintaining confidentiality of the user/purchaser. During each online purchase transaction, the issuing system generates and provides an email address to the merchant to enable subsequent communication. The email address is associated with a issuing system email account for the user. The merchant may utilize the email address to send subsequent emails to the user via the issuing system. Although the emails could be sent directly to the user's computer, the emails are instead held at the issuing system for online retrieval by the user when logged into the user's account. A separate email account may be set up for each transaction or for each merchant for each user. The user remains anonymous to the merchant if desired. If a merchant sells the email information to anyone else, the user may automatically identify the merchant that sold the information.

A promotion system is also disclosed. A partnership may be established with any distributor of products with serial numbers. For example, any cola can of a cola manufacturer or distributor may be turned into a winning piece, simply by associating the merchant's serial number, codeword or symbol (MSN) as a winning number. Pre-existing products and packaging either before or after sale or distribution may be included, so that there would be no need to retrofit packaging with supplements. The merchant/distributor simply provides all participating MSN's to the proxy system and identifies winning numbers. The merchant publishes or otherwise promotes the promotion or contest in any desired manner, such as by printing rules and directions on packaging or by advertising via any media, such as radio or television advertisements. A web address is supplied to direct the public to an initial web page to participate. This provides online traffic to the merchant's web site. Radio station promotions are easily enabled simply by broadcasting the promotion information.

In one embodiment, a link is provided at the merchant's web site to direct online traffic to the issuing system, which forwards the link to a corresponding web page or the like. The entrant is provided with an MSN entry form for entering the MSN. If the MSN is a winning number, the issuing system directs the winning entrant to an online cash account with the prize money. A non-winning entrant may be so notified, or may be invited to open a cash account with a consolation prize. One such prize is a multiplier that multiplies any funds deposited into the account to increase the balance. Other embodiments are contemplated. A query program or game program may be executed online when the entrant interfaces the initial web site. The query program may be utilized, for example, to enable the entrant to answer questions or the like, such as one or more trivia questions. Any type of game program may be executed to evaluate and compare the game skills of the entrant for purposes of the promotional scheme. Winning entrants are directed to the issuing system to establish the winning account and retrieve the prize money. Non-winning participants may still be directed to the issuing system for other purposes, such as selection of consolation prizes or the like.

Most of the cost of conducting the promotional scheme may be avoided. Details of the promotion may be published online and need not be printed on product packaging. Collection of the prize money is handled online in a streamlined and automatic manner. The use of standard mail system or postal service may be avoided for cash prizes. The entrant may provide any information online to collect other type of prizes that may be mailed. The use of a global network such as the internet enables global promotions with no additional cost. Many radio and television broadcasts, for example, are re-broadcast via the Internet for access anywhere. Online participation of the promotional scheme may be conducted anytime and anywhere by anybody. These capabilities provide a substantial increase in the value and reduction of costs of the promotional scheme as compared to traditional methods. In addition, the transdigital gateway for card distributors as described above is also available to those who choose to implement the system as a promotional tool, thus enabling a promoter 917 (FIG. 9) to deliver subsequent advertising to those end users 903 that opened or recharged accounts from funds derived from the accounts database 323 as a result of the promotion event.

FIG. 1 is a block diagram illustrating charge number distribution from an issuing or sponsoring bank (IB) 101 and corresponding application. The issuing bank 101 is a bank or financial institution that is a member of an association of banks that sponsor certain credit or debit cards provided or licensed by Visa, MasterCard, American Express, Discover, etc. The issuing bank 101 typically distributes credit cards or the like to identified individuals or organizations that meet certain credit requirements. The issuing bank 101 establishes an account data base 103 including a plurality of separate direct deposit accounts (DDA), each for a separate individual or organization. As shown, the account data base 103 of the issuing bank 101 includes a multiple number of DDA accounts, including Account 1 DDA, Account 2 DDA, etc.

The account database 103 of the issuing bank 101 includes an issuing system (IS) account DDA 102 that is associated with a issuing system 107. The issuing bank (IB) 101 reserves a set or bin of IS charge numbers 105 for the IS account 102 for use by the issuing system 107 as customer. It is noted that the issuing bank 101 may actually issue the IS charge numbers 105 to an entity associated with the issuing system 107, where the entity is a person or business entity or the like. The issuing system 107 further divides the IS charge numbers 105 into two separate application categories including card numbers 109 and purchase numbers 111. As further described below, the card numbers 109 are provided or otherwise encoded upon plastic cash cards or the like and the purchase numbers 111 are each utilized for an individual online purchase transaction.

The IS charge numbers 105 may be in any acceptable format. In one embodiment, the IS charge numbers 105 are in the universally-accepted credit or debit number format comprising 16 numeric digits, such as is standard with "universally-accepted" Visa or MasterCard or American Express numbers as known to those of ordinary skill in the art. For example, the first four digits indicate a sponsoring or issuing bank and the next two digits indicate a bin of numbers. Several bins have been previously utilized to denote ATM, debit, credit, business credit, business debit, etc. It is noted, however, that the IS charge numbers 105 may comprise any format now known or subsequently adopted as an appropriate and accepted format among distributors, merchants, manufacturers, etc., and thus may comprise more or less than 16 digits, and that may adopt alphanumeric numbering or the like. In general, any such numbers are considered "valid" or "authorized" charge numbers for use in conducting or otherwise consummating transactions, including various financial transactions, as described herein.

The issuing system 107 includes a computer network communication system 108 that enables the issuing system 107 to communicate with a computer communications network (CC) network 112 for enabling online purchase transactions. The computer communications network 112 may include or otherwise incorporate any type of local area network (LAN) or wide area network (WAN) as known to those skilled in the art. The computer communications network 112 may incorporate all or a substantive portion of any public/private global network online system (such as the "Internet") and any intranets or extranets as desired. The issuing system 107 further includes telephonic communication system 110 for enabling communications with a telephonic network 114. As described previously, the electronic communications network encompasses the computer communications network 112 and the telephonic network 114. The issuing system 107 further includes a processor system 113 that enables interface and communication with a charge settlement network 115, such as the electronic EFT network and/or the ACH network or the like. The charge settlement network 115 enables any transfer of funds initiated through an electronic terminal, telephone, computer or magnetic tape, and may further include the EFT network, the ACH network, Fedwire transfers and transfers made at ATMs and point-of-sale (POS) terminals. The issuing system 107 is a certified financial data processor of the IS charge numbers 105 and the processor system 113 is configured to handle processor functions via the charge settlement network 115. In this manner, the issuing system 107 is configured to interface the charge settlement network 115 and to operate as processor of the IS charge numbers 105, including the card numbers 109 and the purchase numbers 111.

It is noted that the charge settlement network 115 incorporates, comprises or is otherwise part of the same charge settlement network that is used by online and/or brick and mortar merchants or the like to authorize, clear, settle, etc. transactions being conducted in association with valid charge numbers, such as standard debit or credit numbers provided on charge cards. For example, brick and mortar merchants typically include a validation unit or card reader or the like as part of the charge settlement network 115 for reading encoded charge numbers on magnetic strips on charge cards or the like. The charge card is swiped in the card reader during a purchase transaction or the like, where the card reader reads and forwards the retrieved charge number via the charge settlement network 115 to an authorized or certified processor for the charge number to clear and/or settle the transaction.

The issuing system 107 further includes a transaction and account system 119 coupled to the computer network communication system 108, the telephonic communication system 110 and the processor system 113. The transaction and account system 119 shown generally incorporates the functions described in previous disclosures for the proxy system, including user interface(s), account activation system(s), account management system(s), transaction system(s), etc. As further described below, the transaction and account system 119 generally enables access to and management of one or more cash accounts, and also handles and enables online transactions via the computer communications network 112. The IS charge numbers 105 are stored on a storage device 117 coupled to the transaction and account system 119. The storage device 117 represents any type of storage or memory device or system, such as tape or disk drives or the like configured with magnetic or optical media as known to those of ordinary skill in the art. The storage device 117 may be a single device or a plurality or bank of devices or computers or disk drives or the like.

Figure 2:
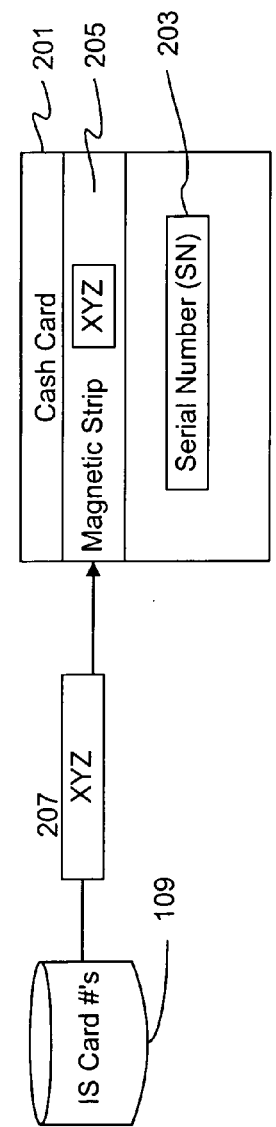
FIG. 2 is a block diagram illustrating an exemplary cash card provided or otherwise encoded with a selected card number.

FIG. 2 is a block diagram illustrating an exemplary cash card 201 provided with a selected card number "XYZ" 207. One or more of the card numbers 109 are provided on a purchase media sold to the public. The purchase media may comprise a cash card 201 that may be configured similar to a standard debit or credit card having the same size and shape or configured according to any other similar wallet-sized card. The cash card 201 includes a surface for printing any type of information, such as a serial number (SN) 203. The serial number 203 is utilized to establish an online cash account with the issuing system 107 for enabling online purchases. In the embodiment shown, the cash card 201 further includes a magnetic strip 205 for encoding any type of information associated with the cash card 201 or the issuing system 107 such as a partial serial number, card advertising sponsor information, card bank sponsor information, lot number, monetary value, etc. As shown, the card number XYZ 207 from the card numbers 109 is encoded on the magnetic strip 205 of the cash card 201. In this manner, the cash card 201 is implemented to be utilized within the charge settlement network 115 in a similar manner as a bank or debit or ATM cash card utilized at any ATM. The card number XYZ 207 may additionally be printed on or otherwise inscribed into the cash card 201 as is typical for standard charge cards for easy reading and access. For improved security reasons, however, the card number XYZ 207 is not printed or inscribed but remains encoded only. Encoding only embodiments provides improved security in that the card number is not readily retrievable or accessible. As described further below, it may be desired to only authorize transactions with the card number in conjunction with a corresponding personal identification number (PIN) in a similar manner as a debit card.

Figure 3:
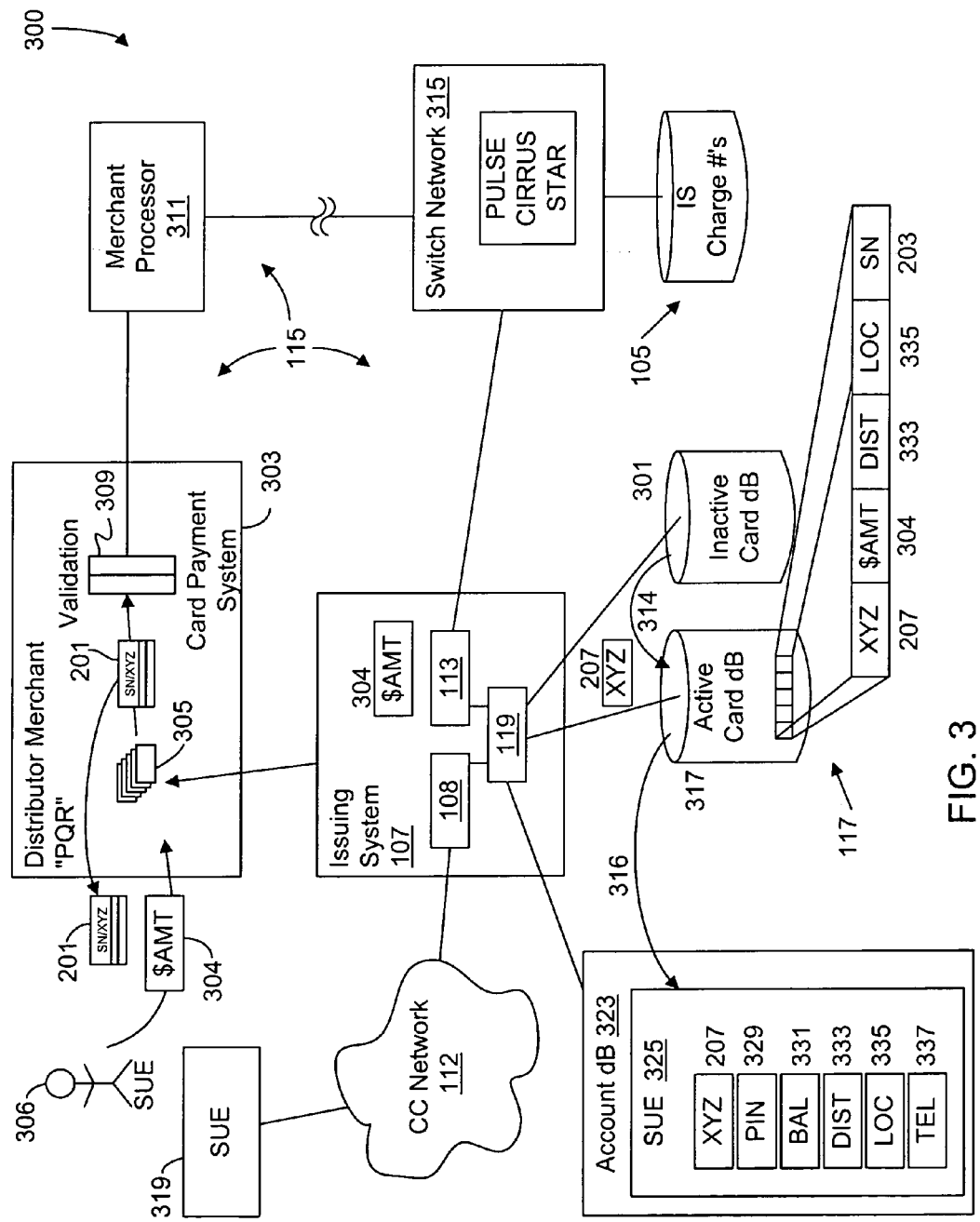
FIG. 3 is a block diagram of a charge number issuing and processing system illustrating usage of cash cards for performing transactions including financial transactions.

FIG. 3 is a block diagram of a charge number issuing and processing system 300 illustrating usage of cash cards similar to the cash card 201 for performing transactions including financial and purchase transactions as described herein. The card numbers 109 are initially provided or otherwise stored within an inactive card database (dB) 301 associated with or coupled to the transaction and account system 119 of the issuing system 107. A plurality of cash cards 305, each similar to the cash card 201, are provided to a distributor merchant 303, such as represented by a particular distributor merchant "PQR". A distributor merchant 303 is simply a merchant that distributes cash cards, such as the cash cards 305. The inactive card database 301 may optionally include information associated with the distributor merchant PQR and/or additional information about the local area or "locality" of the distributor merchant PQR, as further described below. The inactive card database 301 may also include a unique serial number for each of the cash cards 305, such as the serial number 203.

A customer 306, referred to as "SUE", purchases one of the cards 305 in exchange for cash 304 of a certain cash amount ($AMT) 304 provided to the distributor merchant PQR. The distributor merchant PQR selects a cash card from the stack 305, such as the cash card 201, and swipes the selected cash card 201 in a card swipe machine or card reader or the like of a card payment system 309 for purposes of validation and activation and to initiate a point of sale (POS) transaction associated with the selected cash card 201. The card payment system 309 is coupled to the charge settlement network 115 as previously described in any standard fashion, such as via a telephonic network or the like. It is noted that most merchants include such a card reader or the like to clear transactions normally associated with debit or credit cards using the charge settlement network 115 to clear transactions. Since the card number on the selected cash card is a valid charge number in the format of standard charge numbers, there is no further integration required with any particular merchants. The same card readers employed for standard charge cards are used to conduct the POS transaction to activate the card number on the selected cash card.

When the cash card 201 is swiped in the card payment system 309, the information on the magnetic strip 205 is provided via the charge settlement network 115 to a merchant processor 311 or the like. The merchant processor 311 "settles" the POS transaction through the charge settlement network 115 as part of the charge settlement network in a normal or standard manner. In one embodiment, a merchant discount associated with the particular merchant initiating the POS transaction, such as the distributor merchant PQR, is deducted from the transaction amount. During the clearing process, the merchant processor 311 forwards the transaction information to the particular association (not shown) of which the issuing bank 101 belongs, such as Visa or MasterCard or American Express or Discover, etc. The association forwards the transaction information to a switch network 315 within the charge settlement network 115. The switch network 315 has previously been provided with the IS charge numbers 105 issued to the issuing system 107. In one embodiment, the switch network 315 stores the IS charge numbers 105 locally. The switch network 315 forwards or otherwise routes the information to the issuing system 107 as certified processor since the card number XYZ 207 is part of the IS charge numbers 105 to be processed by the issuing system 107. The processor system 113 retrieves the information from the distributor merchant 303 and determines if the received number is within the inactive card database 301. If the received number is recognized as a valid card number within the inactive card database 301, such as the card number XYZ 207, then the card number XYZ 207 is moved from the inactive card database 301 into an active card database 317 as indicated by transfer arrow 314. In this manner, the card number XYZ 207 has effectively become activated. It is noted that the databases 301, 317 are incorporated on the storage device 117 in the embodiment shown, although the databases may be stored in any other manner in any desired format.

In one embodiment, the distributor merchant PQR provides the purchase amount 304 provided from customer SUE 306 during activation in a similar manner as a purchase amount provided for a credit card purchase transaction. Thus, the purchase amount 304 is transferred to the issuing system 107 via the charge settlement network 115 during activation. The purchase amount 304 is stored and associated with the card number XYZ 207 for subsequent purposes of activation of an associated account. In an alternative embodiment, the cash card 201 is associated with a predetermined amount, such as $20, $50, $100, or the like, and the distributor merchant PQR has the responsibility to collect the appropriate amount of funds for the face value of the cash card 201. In the latter embodiment, the purchase amount 304 is initially stored in the inactive card database 301 along with the card number XYZ 207. The purchase amount 304 may be incorporated within the serial number 203 of the cash card 201 and identified at the issuing system 107.

The active card database 317 includes other information that is associated and stored with the particular activated card number XYZ 207. The associated information may be retrieved from the inactive card database 301 if initially stored there, or is retrieved via the charge settlement network 115 from the magnetic strip 205 and any other transaction information forwarded via the charge settlement network 115. In particular, the active card database 317 stores the activated card number XYZ 207 along with the cash or purchase amount 304 and a distributor or promoter identifier 333 identifying the particular distributor merchant PQR associated with the cash card 201. The active card database 317 may further store a portion of or the entire serial number 203 associated with the particular card number XYZ 207. For example, the card numbers and corresponding serial numbers may initially be stored in the inactive card database 301 after the cash cards are created. The proxy system 207 may further store locality information (LOC) 335 associated with the particular distributor merchant PQR. The locality information 335 identifies a particular local geographic area associated with a distributor merchant 303, such as PQR. The locality information 335 may be determined in any one of several manners. In one embodiment, the locality information 335 identifies a county, city, region, state, etc. of a distributor merchant 303. The locality information 335 may alternatively indicate a plurality of other distributors within the same geographic area as the distributor merchant 303. In this manner, the issuing system 107 may preliminarily associate a distributor identifier and locality information with a corresponding card number and the cash card when a stack of cash cards is initially provided to a distributor merchant 303, or at a subsequent time when a cash card is actually purchased by a customer via a distributor merchant 303 and the charge settlement network 115.

The customer SUE 306 subsequently accesses the computer communications network 112 via a node or computer, such as a SUE computer 319, to create a cash account "SUE" associated with the validated cash card 201 and to set a cash balance amount (BAL) 331 according to the purchase amount 304. Alternatively, the purchase amount 304 associated with the cash card 201 is added to the cash balance 331 of an existing SUE account. The customer SUE 306 using the SUE computer 319 interfaces the issuing system 107 via the computer communications network 112 and provides the serial number 203 identifying purchase of the cash card 201. In one embodiment, for example, the serial number 203 is associated with the activated card number XYZ 207 since provided on the same cash card 201. The customer SUE 306 indicates the desire to either create a new account in an accounts database 323 of the issuing system 107 or to otherwise update an existing cash account. In either event, a SUE account 325 is created or otherwise accessed and updated. The accounts database 323 may be stored on the storage device 117 in a similar manner as previously described.

The SUE account 325 is created or otherwise updated by the issuing system 107 to include or otherwise be associated with the card number XYZ 207 and any other information to enable online transactions by the customer SUE 306 via the issuing system 107. For example, any information stored in the active card database 317 corresponding to the card number XYZ 207 is transferred to or otherwise associated with the SUE account 325 as indicated by arrow 316. In particular, the balance 331 of the SUE account 325 becomes the purchase amount 304 or the purchase amount 304 is added to any existing prior balance. The SUE account 325 is updated with the distributor identifier 333 and the locality information 335. The serial number 203 may optionally be stored if desired. The distributor identifier 333 identifies the distributor merchant 303 such as PQR at which the cash card 201 was purchased and the locality information associated with the distributor merchant 303. The SUE account 325 may further include a PIN 329 that may be utilized in conjunction with the cash card 201 for off-line purchases and retrieval of cash. The SUE account 325 may further include or otherwise be updated with a telephone number identifier (TEL) 337. The telephone number identifier 337 is a seven digit access number or the like that may be used in conjunction with the telephonic network 114 to identify the SUE account 325 for fund transfers or deposits or the like. The telephonic network 114 may be voice activated if desired, so that the telephone number identifier 337 may be entered manually via a telephone keypad or the like or may be entered verbally.

Figure 4:
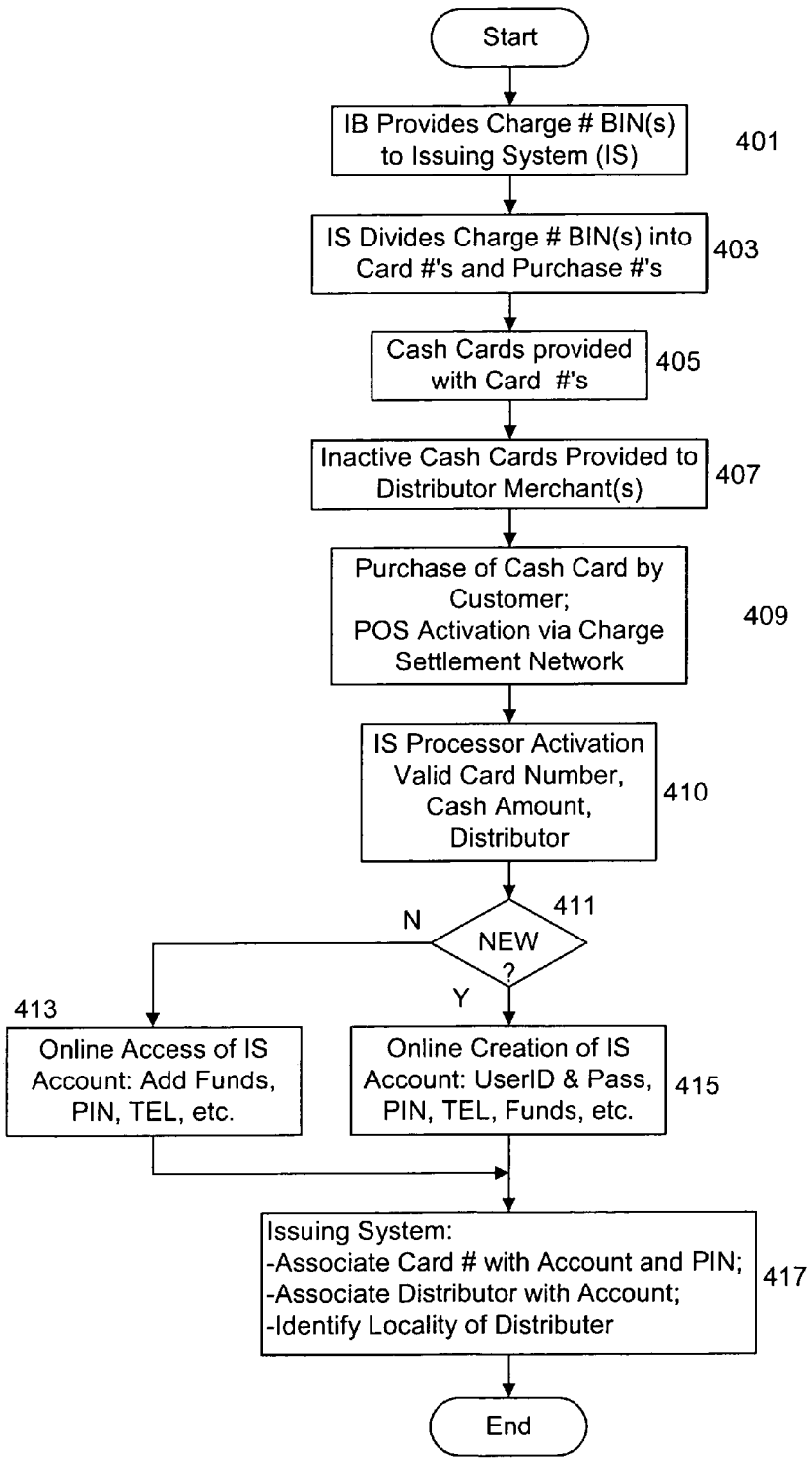
FIG. 4 is a flow chart diagram illustrating activation and operation of the charge number issuing and processing system of FIG. 3.

FIG. 4 is a flow chart diagram illustrating activation and operation of the charge number issuing and processing system 300. At first block 401 the issuing bank 101 provides the IS charge numbers 105 to the issuing system 107. At next block 403, the issuing system 107 divides the charge number bin into card numbers 109 and purchase numbers 111. At next block 405, one or more cash cards are provided with corresponding card numbers and provided to distributor merchants 303, such as the distributor merchant PQR. The card numbers may be encoded if desired, such as onto a magnetic strip or the like. At next block 409, a customer, such as customer SUE 306, purchases a cash card, such as the cash card 201, at a distributor merchant 303, and the purchased cash card is POS activated by submitting the number via the charge settlement network 115. At next block 410, the issuing system 107 operates as processor during the POS transaction to activate the card number XYZ 207 of the cash card 201 via the charge settlement network 115 and to determine the associated cash amount, if desired, along with an associated distributor identifier 333 and locality information 335. The activated card number is stored along with the associated cash amount and other associated information, such as in the active card database 317.

At next block 411, the purchaser of the cash card accesses the issuing system 107 via the computer communications network 112 and either establishes or activates a new cash account or accesses and adds funds to an existing cash account. For an existing cash account, operation proceeds to next block 413 in which the customer accesses the existing account, provides the serial number 203, and adds the purchase amount 304 to the existing account. Also, the PIN 329 may be assigned and associated with the activated card number. Alternatively, if a new account is to be created, operation proceeds to next block 415 in which the customer performs online initiation and creation of the cash account via the issuing system 107. In particular, the serial number 203 is provided to associate with the cash card 201 and the customer provides a user identifier and password for subsequent access of the account. The user identifier and password is collectively referred to as identification information to identify the user or customer for subsequent access of the cash account. Also, a PIN is assigned to the card number 327, if desired, and the purchase amount 304 is added to the account. At next block 417, the issuing system 107 associates the information, including card number, purchase amount, PIN, distributor identifier, locality information, telephone number identifier, etc. with the existing account or the new account and operation is completed.

It is noted that the account 325 and the customer 306 are both associated with then name "SUE" as shown for purposes of illustration and clarity. It is understood, however, that the customer may remain anonymous by providing any arbitrary user ID and password that does not identify the particular customer. Thus, the actual name, address, telephone number, etc. and any other personal information remains confidential and need not be conveyed for the charge number issuing and processing system 300 to successfully operate.

Figure 5:
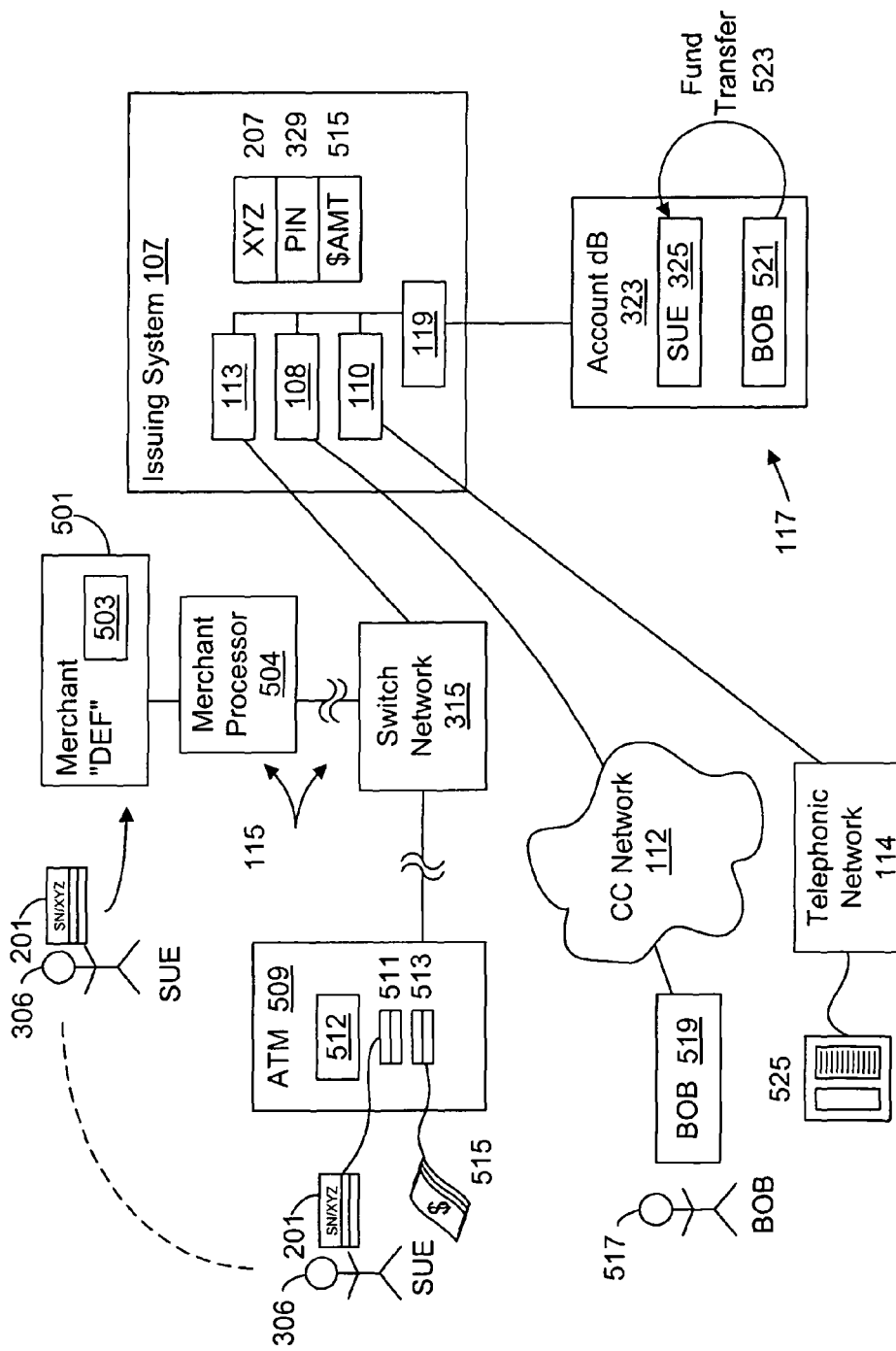
FIG. 5 is a block diagram illustrating exemplary use of cash cards in association with cash accounts through the issuing system of FIG. 1.

FIG. 5 is a block diagram illustrating use of cash cards as described herein in association with cash accounts through the issuing system 107. The customer SUE 306 presents the cash card 201 to any merchant 501, such as a particular merchant "DEF", that accepts debit cards as payment for goods or services. In exchange for goods and services, the merchant DEF receives the cash card 201 for payment via a card payment system 503, which is similar to the card payment system 309 and is configured to receive and forward a PIN. For example, the cash card 201 is swiped by the merchant 501 in a card reader or the like, and the PIN is entered on a keypad or the like. Thus, the customer SUE 306 provides the PIN 329 in conjunction with use of the cash card 201 to the merchant 501, which then clears the transaction via the charge settlement network 115. The information on the magnetic strip 205, the purchase amount 304 and the PIN are conveyed to a merchant processor 504 associated with the merchant DEF, which performs clearing and settling functions in a similar manner as described for the merchant processor 311. The merchant processor 504 may also deduct any merchant discount on behalf of the merchant DEF. During the clearing process, the merchant processor 504 forwards the transaction information to the switch network 315 via the charge settlement network 115 as previously described. The card number XYZ 207 is determined by the switch network 315 to be associated with the issuing system 107 as processor, so that the transaction information is conveyed to the issuing system 107 as previously described.

The issuing system 107 receives the transaction information via the charge settlement network 115 and performs validation, verification and/or authorization transactions as necessary for processing. For example, the transaction and account system 119 receives a card number, a PIN and a purchase amount. The transaction and account system 119 verifies whether the received card number is the same as any activated card number in the accounts database 323. For the cash card 201, for example, transaction and account system 119 accesses the SUE account 325 from the accounts database 323. The transaction and account system 119 determines if enough funds are available in the SUE account 325 for the purchase transaction, such as comparing the purchase amount of the transaction with the cash balance 331. If the received card number is valid or otherwise activated and if the purchase amount 304 does not exceed the cash balance 331 of the SUE account 325, then the purchase transaction is authorized and accepted by the issuing system 107. If approved, the processor system 113 returns authorization information, such as authorization codes or the like, to the merchant DEF via the charge settlement network 115. The merchant DEF respondingly accepts payment via the cash card 201. Otherwise, the issuing system 107 denies the transaction and the processor system 113 returns denial information, such as denial codes or the like, to the merchant DEF via the charge settlement network 115. If a PIN is required for authorization, then the transaction and account system 119 further compares the received PIN with the PIN 329 and authorizes the transaction only if the respective PINs are the same.

The customer SUE 306 may further use the cash card at a standard ATM 509 in association with the PIN 329, where the ATM 509 initiates and conducts a cash transaction on behalf of the customer SUE 306. In particular, the cash card 201 is inserted into a card receiver slot 511 and the PIN 329 is entered into a keyboard 512 or the like of the ATM 509. The customer SUE 306 also punches in a desired cash amount 515 via the keyboard 512. The PIN 329, the desired cash amount 515 and the information on the magnetic strip 205 including the card number XYZ 207 is forwarded by the ATM 509 and the switch network 315 of the charge settlement network 115 to the issuing system 107 as processor. The transaction and account system 119 of the issuing system 107 verifies the card number XYZ and the PIN 329 and verifies or otherwise compares the information with the SUE account 325. The cash amount 515 is compared with the account balance 331 of the SUE account 325. If the received card number is valid as being the same as an activated card number, such as the card number XYZ 207, if the received PIN is the same as the authorized PIN, such as the PIN 329, and if the cash amount 515 does not exceed the current balance 331 in the SUE account 325, then the issuing system 107 accepts the transaction. Otherwise, the transaction is denied. The acceptance or denial information is returned to the ATM 509 by the processor system 113. If the transaction is accepted, the ATM 509 provides the cash amount 515 to the customer SUE 306 via a cash slot 513. There may be other operating parameters that may be considered, such as a cash transaction limit on the amount of cash withdrawal at the ATM 509. Such limits, if effective, are also considered by the ATM 509 and/or the issuing system 107 before accepting the transaction. In this manner, the cash card 201 is used much the same way as a cash debit or credit card in a standard ATM.

A user 517 of the issuing system 107, referred to as "BOB", may access the issuing system 107 via a BOB computer 519 or the like coupled to the computer communications network 112. A BOB account 521 is either created or accessed within the account database 323 of the issuing system 107 to enable the customer BOB 517 to perform online transactions via the computer communications network 112. Further, the user BOB 517 may transfer funds from the BOB account 521 to the SUE account 325 via the issuing system 107 as indicated by a fund transfer arrow 523. The customer SUE 306 may then access the transferred funds from the SUE account 325 utilizing the cash card 201 at the ATM 509 or via any merchant 501, or via online transactions. The user BOB 517 may also perform the fund transfer 523 via a standard telephone 525 coupled to the telephonic network 114. In particular, the user BOB 517 may dial a predetermined number, such as a toll or toll-free number, via the telephonic network 114. The telephonic communication system 110 of the issuing system 107 enables access to the accounts database 323 via the transaction and account system 119 for authorized users. The telephonic communication system 110 may be voice-activated enabled if desired to allow verbal entry of the telephone number identifier 337. In this manner, the user BOB 517 may utilize the telephone number identifier 337 of the SUE account 325 to transfer funds from the BOB account 521 to the SUE account 325. Given that the fund transfer occurs within the accounts database 323, the transfer of funds can be subject to database manager rules. In one embodiment, a restriction can be added to the funds transferred by Bob, yet allowing Sue to verify that the transfer cannot be undone, and that the funds if freed from the restriction by Bob, or the issuing system 107, would be made available for purchase or withdrawal.

Figure 6:
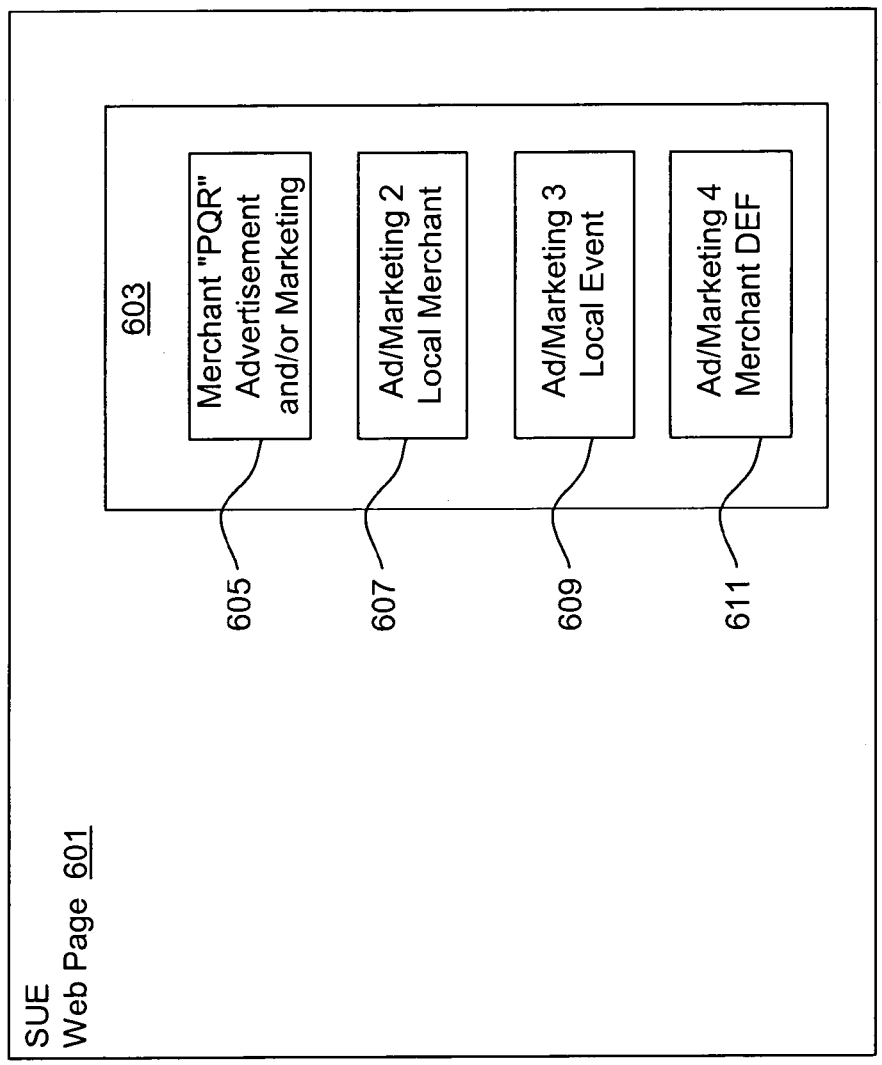
FIG. 6 is a screen shot of an exemplary web page that appears during an online session when a customer is logged into the issuing system of FIG. 1.

FIG. 6 is a screen shot of an exemplary web page 601 that appears during an online session when the customer SUE 306 is logged into the issuing system 107 or the SUE ACCOUNT 325. The web page 601 includes an advertisement and marketing section 603 reserved for advertising. The advertisement and marketing section 603 may include advertisements and/or marketing information associated with the distributor merchant PQR or other merchants corresponding to the locality information 335 associated with the SUE account 325, or a promoter 917 as described in FIG. 9 associated with a promotion used to create or recharge an account associated with the user JOE 903. For example, the merchant PQR from which the cash card 201 was purchased may post advertisement and/or market information 605 on the web page 601. Furthermore, another local merchant identified or otherwise associated with the locality information 335 may post advertisement and/or market information 607 within the advertisement and marketing section 603. The advertisement and marketing section 603 may further include any other advertisements, marketing or event information associated with the locality information 335, such as local event and/or market information 609. If and when the customer SUE 306 purchased from the merchant DEF, information identifying the merchant DEF may be conveyed to the issuing system 107, which may further associated the DEF merchant information with the SUE account 325. In this manner, the merchant DEF may be identified to the issuing system 107 and contacted for participation. If merchant DEF chooses to participate, then the merchant DEF may be allowed to post an advertisement 611 in the advertisement section 603 of the web page 601 to communicate to the customer SUE 306.

It is noted that each advertisement and/or market information 605-611 may comprise an advertisement for the associated distributor or merchant, such as a logo or the like with trade name and any other desired information. In addition or in the alternative, each advertisement and/or market information 605-611 may include marketing information, such as any price specials, promotions, printable coupons or the like, etc. in an effort to entice the customer or user to return to or otherwise visit the distributor or merchant for new or additional business. Printable coupons or the like have proved to be relatively effective and attractive to consumers for new or repeat business.

In this manner, the web page 601 is used as a transdigital gateway to enable transdigital advertising and/or marketing to post advertisements and marketing information to a customer or user of the issuing system 107 associated with a particular locality, county, city, or any other geographic area. The locality information may be identified or otherwise associated with a local distributor merchant 303 from which the cash card was purchased, or with any merchant in which the cash card is utilized to purchase goods or services. It is appreciated that the advertising/marketing is directed to users within a locality that otherwise remain anonymous and effectively shielded via the issuing system 107.

The transdigital gateway provides a powerful business advantage to both the issuing system 107 and distributor merchants 303. The distributor merchants 303 may have little or no incentive to distribute the cash cards 305 on behalf of the issuing system 107 without such transdigital gateway or another incentive or motivational scheme. Examples of alternative schemes include a premium offered at the POS transaction or a discount offered to distributors. In the premium scheme, each cash card is sold at a premium, such as, for example, a $10 card sold for $12 or the like. This premium technique has proved disfavored by consumers who would rather receive $10 value for $10 spent. In the discount scheme, the online merchants that accept payments via the cash card offer a discount on goods or services to obtain traffic that might not otherwise have been realized. The discount is ultimately provided back to the distributor. This discount scheme, however, is very limiting in that the cash card could only be utilized to purchase from participating merchants. Instead, the issuing system 107 provides a prepaid cash account that enables purchases at any online merchant. Further, the issuing system 107 provides the transdigital gateway to provide substantial business incentive, including targeted advertising and marketing, to distributors.

Figure 7A:
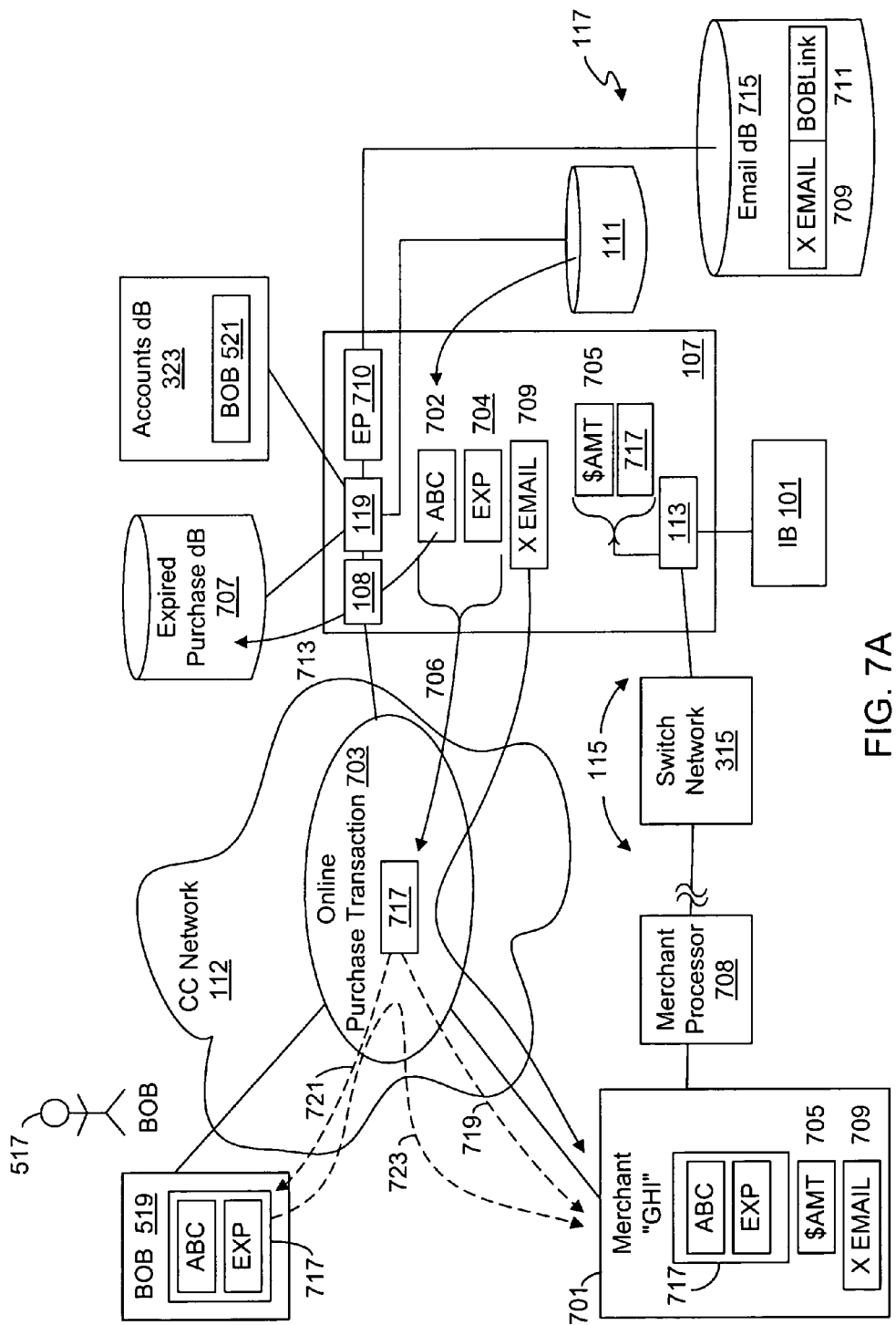
FIG. 7A is a block diagram illustrating an online purchase transaction by a user using the issuing system via the computer communications network to request a valid purchase number.

FIG. 7A is a block diagram illustrating an online purchase transaction by a user or customer using the issuing system 107 via the computer communications network 112. The user BOB 517 accesses the computer communications network 112 via the BOB computer 519 and shops for goods and services online via a plurality of merchants 701. The user BOB 517 identifies a good or service to be purchased from a merchant 701, such as a particular merchant "GHI", and decides to purchase the goods or services. The issuing system 107 is invoked to conduct an online purchase transaction 703 by the user BOB 517. In particular, the user BOB 517 via the BOB computer 519 interacts with a purchase page from the merchant GHI indicating a desire to purchase. The transaction and account system 119 detects the request for purchase via the computer network communication system 108, selects a valid purchase number and provides the selected purchase number to enable consummation of the online purchase transaction 703. For example, the transaction and account system 119 retrieves a selected valid purchase number, such as "ABC" 702, from the purchase number database 111 and provides the selected valid purchase number ABC 702 via the computer communications network 112. It is noted that the online purchase transaction 703 is only one example of a request for a valid charge number. The user BOB 517 or any other issuing system 107 user may request a valid charge number via the computer communications network 112 in and other manner, such as directly requesting via the issuing system 107.

If necessary or if otherwise desired, the transaction and account system 119 may also generate an expiration date (EXP) 704. The expiration date 704 may be determined by the issuing bank 101 when provided to the issuing system 107, or may alternatively be determined by the issuing system 107. The issuing system 107 may pre-determine the expiration date 704, or may generate the expiration data 704 dynamically during the online purchase transaction 703. In one embodiment, the expiration date 704 is the same date of the online purchase transaction 703 or otherwise has a short expiration period. In another embodiment, the expiration date 704 is randomly generated within parameters to ensure acceptance by online merchants 701, such as the merchant GHI. For example, the expiration date 704 retains a valid format "MMYY", where MM represents two digits for any month 01-12 and YY represents two digits for any valid year 00-99. Of course, Y2K compliant formats are contemplated. Also, the valid expiration date 704 is the same date or is a future date to prevent rejection by online merchants 701. The valid charge number ABC 702 and the valid expiration date 704 are collectively shown as valid charge information 717.

As indicated by arrow 706, the transaction and account system 119 provides the valid charge information 717 via the computer communications network 112 in response to the online purchase transaction 703. In one embodiment as indicated by dashed arrow 719, the valid charge information 717 is provided to the merchant GHI to consummate the online purchase transaction 703, such as via a purchase page provided by the merchant GHI. For example, the purchase number ABC 702 and the expiration date 704 are inserted into the merchant purchase page. In an alternative embodiment, the valid charge information 717 is provided to the user BOB 519 as indicated by dashed arrow 721. In either case, the issuing system 107 associates the valid charge number ABC 702 or the valid charge information 717 with the user BOB 519 for transaction authorization. Such association may be performed in a similar manner as described previously for the selected card number XYZ 207 associated with the SUE account 325, such as storing the valid charge number ABC 702 or the valid charge information 717 in the BOB account 521 associated with the user BOB 517. Of course, any other manner of association may be employed.

The user BOB 519 has an option of providing the valid charge information 717 to the merchant GHI as indicated by another dashed arrow 723 to consummate the online purchase transaction 703. For example, the user BOB 519 may cut and paste the valid charge information 717 from the issuing system 107 into the merchant purchase page or may select an automatic population option offered by the issuing system 107 that automatically fills the valid charge information 717 into the purchase page upon indication by the user BOB 519. In an alternative embodiment, the user BOB 519 has an option of keeping the valid charge information 717 for a subsequent transaction and terminating the online purchase transaction 703. The valid charge information 717 remains valid for any subsequent purchase transaction as long as not exceeding the provided expiration date 704.

If the user BOB 519 utilizes the valid charge information 717 to consummate the online purchase transaction 703, then the merchant GHI utilizes the charge settlement network 115 to forward the charge information to clear the purchase transaction and determine validity of the purchase number ABC 702 in a similar manner as previously described, except that the transaction is cleared without the use of a cash card or card reader. The verification may occur immediately or subsequently via the charge settlement network 115 in a similar manner as previously described. In particular, the merchant GHI submits the valid charge information 717 including the purchase number ABC 702 and expiration date 704 and a transaction amount ($AMT) 705 to the charge settlement network 115. The valid charge information 717 and transaction amount 705 is received by a merchant processor 708 associated with the merchant GHI. The merchant processor 708 settles the purchase transaction and deducts a merchant discount, if any, in a similar manner as previously described. The merchant processor 708 forwards the purchase transaction information to the switch network 315, which routes the transaction information to the issuing system 107 as processor.

The issuing system 107 is pre-certified as processor for any of the IS charge numbers 105, including the purchase numbers 111. The processor system 113 and the transaction and account system 119 receive and verify the charge number received from the charge settlement network 115 as being the selected purchase number ABC 702. If the received and selected charge numbers are not the same, then the transaction and account system 119 aborts the transaction and the processor system 113 returns denied information. If the charge numbers match, the processor system 113 compares a received expiration date with the associated expiration date 704 provided via the computer communications network 112 with the valid transaction number ABC 702. If the expiration dates do not match, then the processor system 113 returns denied information. It is noted that the expiration date comparison may simply be a match determination rather than an actual expiration determination since the issuing system 107 is more concerned with matching than expiration. If the expiration dates match, the transaction and account system 119 accesses an associated cash account in the accounts database 323 and compares the received transaction amount 705 with the account balance. For example, for the user BOB 519 and the associated purchase number ABC 702, the transaction and account system 119 accesses the remaining cash balance in the BOB account 521 in the accounts database 323. If the cash balance in the BOB account 521 is insufficient for the transaction amount 705, then the processor system 113 returns denied information to reject the transaction. Otherwise, the transaction is approved and the processor system 113 returns authorization information to the merchant GHI, which completes the online purchase transaction 703.

In one embodiment, after the online purchase transaction 703 is completed, the issuing system 107 "expires" the purchase number ABC 702 by storing or otherwise transferring the purchase number ABC 702 into an expired purchase database 707 as indicated by arrow 713. Once expired in this manner, the charge number is no longer considered valid and may not be employed for subsequent purchase transactions. The issuing system 107 provides many valid purchase numbers, detects the provided valid charge numbers used to consummate corresponding purchase transactions, and then expires each one into the expired purchase database 707. The expired purchase database 707 may be stored on the storage device 117. The single use and immediate expiration of purchase numbers provides a significant level of security in that any purchase number utilized via the computer communications network 112 become invalid after completion of the online purchase. If one or more purchase numbers are stolen, either before or after online use, the issuing system 107 as processor detects and denies attempted subsequent purchase transactions. Any information collected during the attempted illicit purchase may be utilized to track down and capture the perpetrator.

The issuing system 107 processes a plurality of such online purchase transactions over a period of time. After a predetermined period of time, or after a certain number of transactions are completed, the issuing system 107 sends settled purchase transactions, including the online purchase transaction 703, to the sponsoring or issuing bank 101. Settled transactions may be sent, for example, via an ACH batch transfer or the like. The issuing bank 101 further settles the transactions with any entities of the charge settlement network 115 as necessary or desired. The issuing bank 101 may also processes ACH transfers or the like from merchants or distributors, such as the distributor merchants 303, and credit funds to the entity associated with the issuing system 107.

An email system including an email processor (EP) 710, coupled to the transaction and account system 119, and an email database 715, interfacing the email processor 710, may further be utilized to enable communication between the user BOB 517 and the merchant GHI from which goods or services were purchased. The email database 715 may be stored on the storage device 117. During the online purchase transaction 703, the merchant GHI may request an email address in order to subsequently contact the user BOB 517. The email processor 710 of the issuing system 107 manufactures a new email account associated with the email database 715, or otherwise accesses an existing email account, and provides an email address 709, denoted "X EMAIL", to the merchant GHI. The email processor 710 further links the X EMAIL address 709 with the BOB account 521 using a BOBLink 711 or the like within the email database 715. Any email from the merchant GHI using the X EMAIL address 709 is forwarded to the BOB ACCOUNT 521 for viewing by the user BOB 517. In this manner, the user BOB 517 may access the BOB account 521 and view the email sent from merchant GHI.

The X EMAIL address 709 is associated with the particular transaction by the merchant, but does not provide any identify or personal information of the user BOB 517. In one embodiment, the X EMAIL address 709 is only linked to the BOB ACCOUNT 521 for receiving emails using the X EMAIL address 709. The user BOB 517 may reply to the merchant sending the email using the email address provided by the merchant. The email from the user BOB 517 is sent from the issuing system 107 on behalf of the user BOB 517 but otherwise does not convey any confidential information. In this manner, the user BOB 517 remains completely anonymous to the merchant GHI or any other merchant 701 and may further be anonymous with respect to the issuing system 107 if desired. The user BOB 517 may contact the merchant GHI directly to discus the contents of the email if desired. It is further noted that if the merchant GHI attempts to sell the X EMAIL address 709 to other vendors or merchants or advertisers, then the user BOB 517 may track the source of the potentially unauthorized email to the merchant GHI.

Figure 7B:
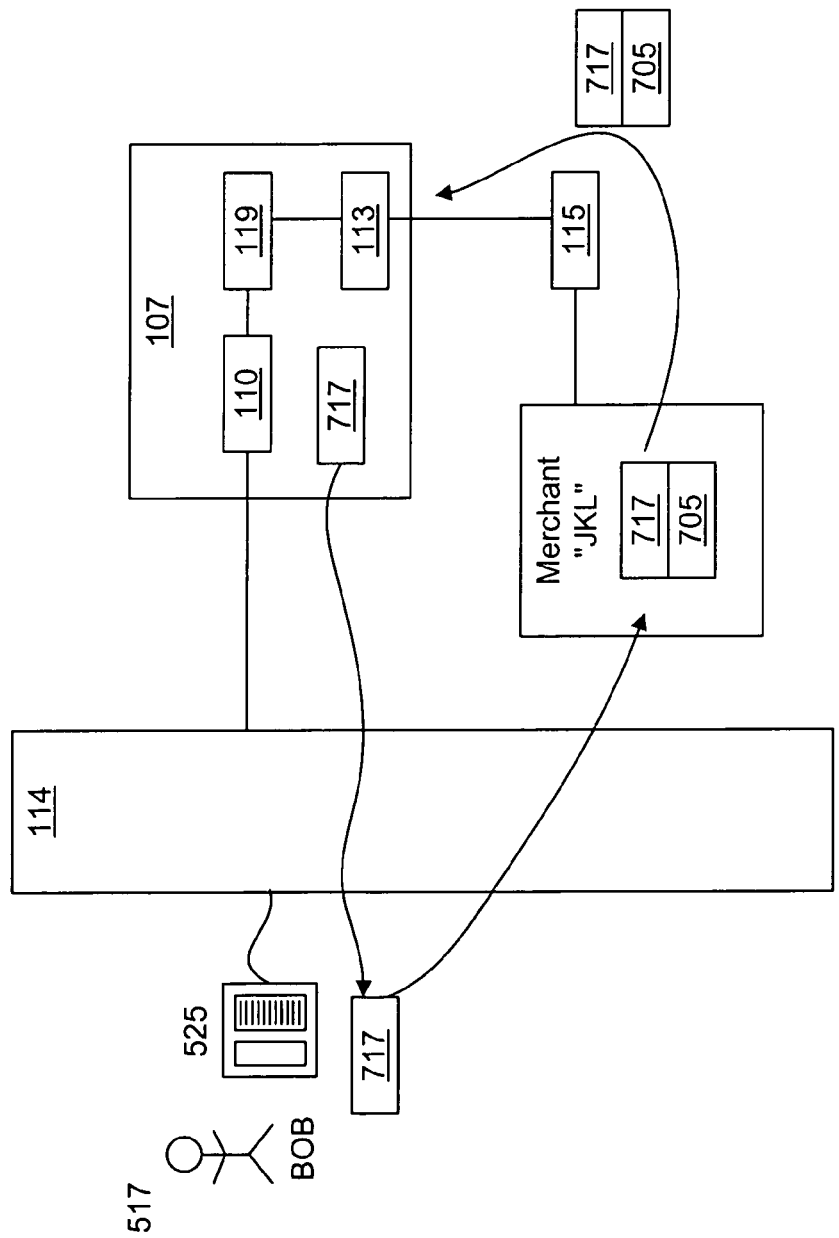
FIG. 7B is a block diagram illustrating a request by a user from the issuing system via the telephonic network to request a valid purchase number and to conduct a purchase transaction with a merchant using the provided valid charge information via the telephonic network.

FIG. 7B is a block diagram illustrating a request by the user BOB 517 from the issuing system 107 via the telephonic network 114 to request a valid purchase number and to conduct a purchase transaction with the merchant GHI using the provided valid charge number via the telephonic network 114. As shown, the user BOB 517 utilizes the telephone 525 to access his BOB account 521 via the telephonic network 114, the telephonic communication system 110 and the transaction and account system 119 of the issuing system 107. In this case, the user BOB 517 requests a charge number to conduct a subsequent purchase transaction. In a similar manner as described above in relation to the online purchase transaction 703, the valid charge information 717 is provided from the issuing system 107 to the user BOB 517 in response to the request, except in this case the information is provided via the telephonic communication system 110 and the telephonic network 114. After the user BOB 517 receives the valid charge information 717, either by the telephonic network 114 or the computer communications network 112, the user BOB 517 may conduct a telephonic purchase transaction with any merchant 701, such as a merchant "JKL", using the valid charge information 717 via the telephonic network 114, such as standard mail order purchases using the telephone 525. The merchant JKL clears the transaction via the charge settlement network 115 in a similar manner as previously described.

Figure 8:
FIG. 8 is a screen shot of an exemplary web page that may be displayed by the issuing system of FIG. 1 to a user computer when accessing their associated prepaid cash account.

FIG. 8 is a screen shot of an exemplary web page 801 that may be displayed by the issuing system 107 to the BOB computer 519 when the user BOB 517 is accessing the BOB account 521. The web page 801 is utilized to provide information of transactions conducted by the user BOB 517 utilizing the BOB account 521 or any other account established or controlled by the user BOB 517. For example, the web page 801 may list any merchants associated with a given transaction, the date of the purchase transaction and the corresponding purchase amount. Furthermore, an email icon 803 may be provided and displayed adjacent any particular transaction and thus associated with the corresponding merchant that sent the email. The user BOB 517 may open the email by clicking or accessing the icon 803. The user BOB 517 may reply to the sender using the return address supplied by the sender in normal email fashion. The email from the user BOB 517 is from the issuing system 107 with the X EMAIL address 709, which does not convey any confidential information. In this manner, the user BOB 517 may correspond with the merchant while remaining anonymous if desired. Of course, the user BOB 517 has the option of directly contacting the merchant to resolve any issues.

Figure 9:
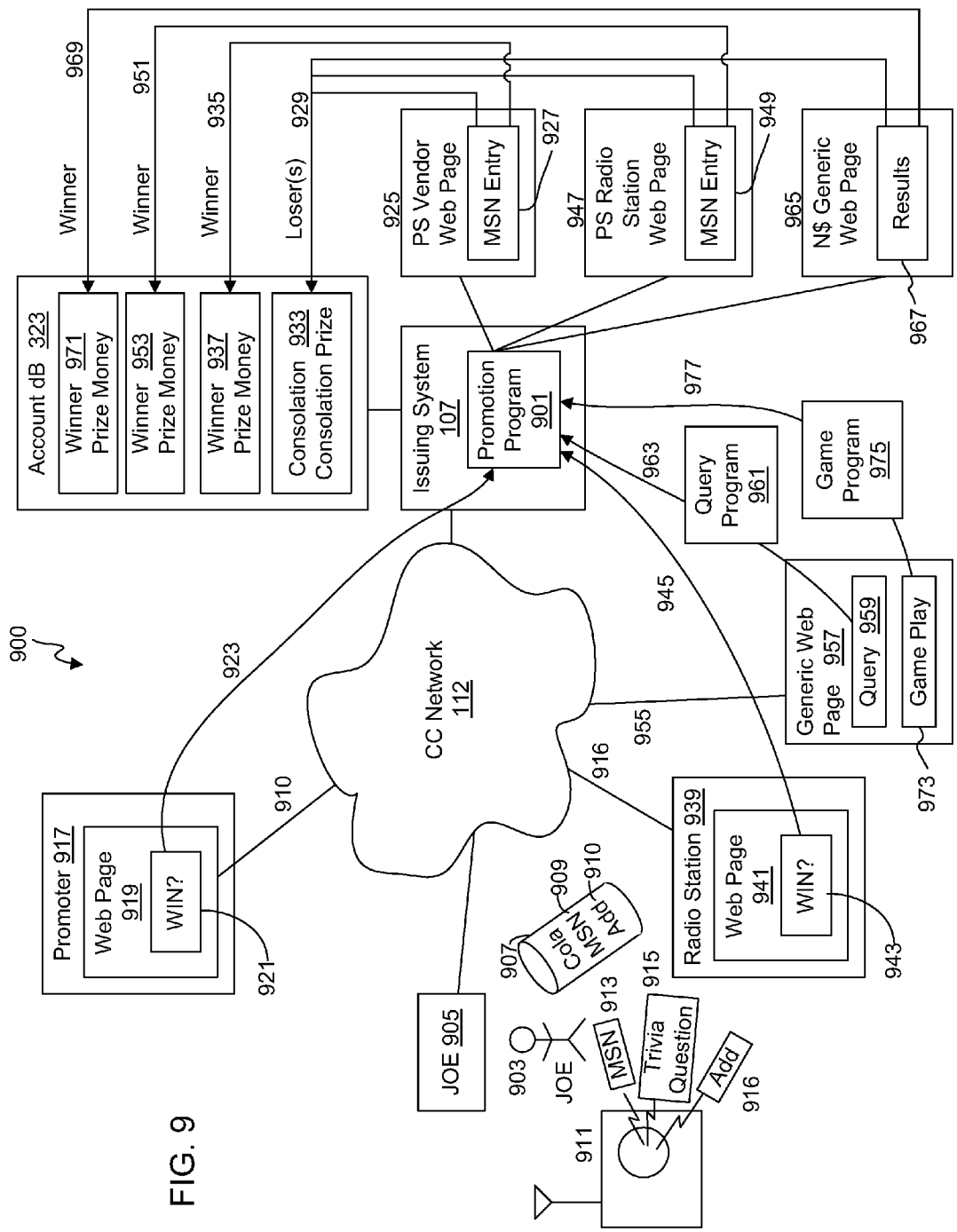
FIG. 9 is a block diagram of a promotion system utilizing the issuing system of FIG. 1 with the account database of FIG. 3.

FIG. 9 is a block diagram of a promotion system 900 utilizing the issuing system 107 with the account database 323. A promotional scheme is determined by a merchant, a manufacturer, a distributor, etc. collectively or individually referred to as the promoter 917, a radio station 939, a television station (not shown), a newspaper (not shown), a company (not shown) or any other entity. In one embodiment, the promoter 917 prints a manufacturer's serial number, codeword or symbol (MSN) 909 directly on product packaging manufactured or distributed by the promoter 917, such as, for example, on a cola can 907. The promoter 917 may then publish additional information about the promotional scheme in any desired manner. The other information may include details and rules about the promotional scheme and a web address 910 or the like that is utilized by an individual to access a corresponding web page 919 associated with the promoter 917 and the promotional scheme. Some or all of the additional information may be printed directly on the product packaging sold to the public. Alternatively, the promoter 917 may utilize any available media to publish the additional information, such as radio, television, newspapers, magazines, periodicals, etc.

The MSN 909 may be determined specifically for purposes of the promotional scheme and printed on the product packaging. Alternatively, the MSN 909 may comprise an existing number generally utilized for any purpose, such as lot numbers, date information, packaging information, etc. In this manner, there is no need to retrofit packaging with supplemental information. In either case, a list of MSN's are provided to the issuing system 107 along with identification of one or more winning MSN's. The web address 910 may be printed on the packaging or published via the media as previously described. A person with a winning MSN that accesses the web page 919 in accordance with the contest procedures wins prizes or prize money as further described below. The ability to utilize existing MSN's on existing packaging enables substantial reduction of cost of conducting the promotional scheme. The other information, such as promotion details, rules, etc. may be published on the web page 919 accessible by anyone using the web address 910.

In a similar manner, the radio station 939 may broadcast information associated with its promotional scheme, such as a details and rules of the scheme, a merchant's serial number, codeword or symbol (MSN) 913 or a trivia question 915 or the like, a web address 916 for accessing a web page 941 associated the radio station 939, etc. The MSN 913 of the radio station 939 may be utilized in a different manner as the MSN 909 since broadcast to multiple people rather than an individual. For example, the first person to access the web page 941 with the published MSN 913 may be considered the winner. The trivia question 915 may be utilized in a similar manner, except that the entrant must answer the question correctly to win.

An entrant 903, referred to as "JOE", purchases a product, such as cola can 907 and reads the MSN 909 from the packaging. The web address 910 may be printed on the cola can 907 or publicized in any manner as previously described. Alternatively, the entrant JOE 903 hears the promotional scheme information from a radio 911 or the like, including the MSN 913 or a trivia question 915 and the web address 916. The entrant JOE 903 accesses the corresponding web page via the computer communications network 112 and a JOE computer 905. The web pages 919 or 914 include a corresponding link button or address 921 or 943, respectively, in order for the entrant JOE 903 to participate in the promotional scheme. Activation of the link 921 or 943 causes a link transfer to the issuing system 107 such as via link 923 or 945, respectively. The links 923 and 945 further include identifier information so that the issuing system 107 associates the link 923 with the promoter 917 and the link 945 with the radio station 939.

The issuing system 107 includes a promotion program 901 that redirects the entrant JOE 903 to a corresponding web page 925 or 947 associated with the promoter 917 or the radio station 939, respectively. The web pages 925 and 947 include corresponding entry blanks 927 and 949, respectively, for entering the MSN 909 or 913 retrieved from the product packaging or heard via the radio 911. One or more of the MSNs may correspond to a winning number and corresponding prize money. If the MSN 909 or 913 is not a winning number, then the entrant JOE 903 is informed that the entered number is a non-winning number for the particular promotion. Nonetheless, the web pages 925 or 947 may redirect the entrant JOE 903 via link 929 to one or more consolation accounts 933. The consolation accounts 933 may be provided with corresponding consolation prizes. One such consolation prize, for example, may be a multiplier that multiplies any funds entered into the corresponding account to increase the funds.

If the MSN 909 or 913 is a winning number entered into the MSN entry 927 or 949, respectively, then the entrant JOE 903 is directed via respective links 935 or 951 to access respective winning accounts 937 or 951. The winning accounts 937 and 951 already include the respective prize money intended for the winner of the particular promotional scheme. Of course, prizes other than cash prizes are contemplated, in which the winning accounts 937 and 951 may include additional information for the entrant JOE 903 to receive the prizes. For example, the entrant JOE 903 may need to supply a shipping or mailing address to receive the prizes. Online cash account cash prizes, however, are particularly convenient and advantageous. It is appreciated that the promotion system 900 provides a very convenient, hassle-free and cost effective manner of distributing prizes to winning entrants, particular cash prizes.

Alternative types of promotional schemes are contemplated. The entrant JOE 903 may alternatively be directed via link 955 to a generic web page 957 representing any promoter 917, radio station 939 etc. The web page 957 includes either a query link 959 or a game play link 961. The query link 959 directs the entrant JOE 903 to a query program 961 in which the entrant JOE 903 enters any information or answers any questions in accordance with the promotional scheme. Alternatively, the game play link 973 directs the entrant JOE 903 to a game program 975 that he/she interacts with to determine promotion results. The game program 975 may test the skills of the entrant JOE 903 for comparison with other contestants, such as via a high score or the like.

If the entrant JOE 903 is not a winner, he/she may be so informed and not further directed. Alternatively, whether the entrant JOE 903 is a winner or not, the query program 961 or the game program 975 may further direct him/her via link 963 or 977, respectively, to the promotion program 901 of the issuing system 107, which further directs the entrant to a generic web page 965. The generic web page 965 includes a results section 967 including associated links or information associated with the particular promotional scheme, such as whether the entrant is a winner or not. If the entrant JOE 903 is not a winner, then the results section 967 may direct the entrant via link 929 to a consolation account 933. Alternatively, the entrant JOE 903 may be directed via link 969 to a winning account 971 with associated prize money or the like as previously described.

It is appreciated that the promotion system 900 illustrated in FIG. 9 provides several advantages over traditional promotional schemes. The distributor desiring to conduct the promotional scheme provides a plurality of associated MSN serial numbers to the issuing system 107. The MSNs may be according to existing numeric designations on corresponding products such as lot number, serial numbers, etc., currently provided on existing products. There would be no need to retrofit previous packaging with supplemental numbers so that any product previously sold or to be sold may become part of the promotion. This helps to reduce the cost of the promotion. Furthermore, the standard mechanism to retrieve prize money is via regular mail system. In the promotion system 900, the cost of the traditional mailing system and prize money delivery is entirely eliminated in favor of online access and instantaneous retrieval of prize money. In particular, if the entrant is a winner, the winner is automatically directed and supplied with an online cash account that may be used immediately for online proxy purchases in conjunction with the issuing system 107. It is further noted that the promotional system 900 can be global and accessible at any location. For example, radio broadcasts, though typically local in nature, are often re-broadcast via the Internet or the like to various remote locations across the globe. This provides automatic global access and advertising at reduced cost and complexity of operation.

The issuing system 107 provides an e-commerce infrastructure that supports powerful advertising and market research capabilities. Such advertising and market research capabilities are available to "affiliates" of the issuing system 107. An affiliate is any merchant or vendor, including distributors, e-merchants conducting online sales and transactions, traditional brick and mortar merchants, etc. that desires to become affiliated with the issuing system 107. A distributor or merchant that is not already an affiliate may become an affiliate through one or more affiliate programs offered by the issuing system 107. Distributors and merchants or the like apply to become affiliates with an appropriate agreement or the like and pay any associated fees depending upon the level of service desired. In one embodiment, a link may be provided to an affiliate certification web page that enables the applicant to supply certain affiliate information, such as contact information, tax status, tax identification number, ACH information, etc. The affiliate certification pages further provide a training program in which a potential affiliate navigates through a series of pages and answers questions, such as in quiz format or the like, to certify the applicant as an affiliate of the issuing system 107.

An affiliate of the issuing system 107 takes advantage of the transdigital gateway and may conduct a powerful advertising campaign via the issuing system 107. In general, the issuing system 107 provides a vehicle for affiliates to communicate to the users of the issuing system 107 on a targeted basis such as utilizing aggregate information or the like. In particular, the issuing system 107 can provide targeted advertising or marketing to selected users when logged on. Furthermore, the issuing system 107 monitors account activity, purchase transactions, browsing habits and patterns, etc. of users, where corresponding aggregate and statistical information is gathered, organized and stored for purposes of market research and/or advertising. Users of the issuing system 107 may remain anonymous and their corresponding personal information may remain confidential regardless of affiliate participation.

The issuing system 107 provides information and services to affiliates, such as a billing account information page providing a list of ACH transactions and the like. Such transaction data may be manipulated and displayed much like an online checking account ledger. For example, a link may be provided to affiliate-specific web pages that display previous orders and status of delivery of current orders. Such pages may further include any other affiliate related information. The issuing system 107 provides advertising management capabilities such as transfer of advertisement graphic files or the like (e.g., TIF, GIF, JPG, etc.) links to an instruction page, specifications page, and other pages with delete, upload, and replace buttons that enables the affiliate to manage advertising files as desired.

The issuing system 107 provides powerful advertising campaign management information and capabilities. An affiliate can select or target advertising to particular users of the issuing system 107 based on types of information and statistics maintained by the issuing system 107. In particular, an affiliate may select from specific geographic areas based on zip code, city, state, region or country and may further target specific stores for advertising. For example, an affiliate may target any users or group of users that have purchased cash cards or that have conducted transactions utilizing a cash card through one or more specific stores or the like. An affiliate may target users based on a particular type of industry. The particular industries may be identified in any one or more of several methods. In one embodiment, the card numbers 109 and/or the purchase numbers 111 may be further divided based on one or more different criteria such as industry, age group, etc. or any combination of categories thereof. In this manner, any transaction associated with an IS charge number 105 may be linked to a particular industry and/or a particular age group for target advertising.

An affiliate can select from specific groups of account holders according to current account balance and/or past account balance history for wallet x-ray targeting. In this manner, an affiliate may target only those users with sufficient funds to purchase the affiliate's goods and/or services. An affiliate may select from specific groups of account holders based on browsing patterns, or the like, such as those users browsing certain types of e-merchants associated with certain types of goods or services. An affiliate may select from specific groups of account holders based on where cash cards have been purchased offline from a distributor. For example, any affiliate distributor or merchant may select and target those users who have purchased cash cards from a different distributors or merchants. Furthermore, affiliates may target users based on Internet Protocol (IP) address, Internet Service Providers (ISP) or the like or any other geographic identifier. An affiliate may target users based on temporal information, such as time and date of online purchase transactions or the like. It is appreciated that affiliates may target users based on any type of information that is tracked, organized and stored by the issuing system 107 such as browser type, URL references, click rates for industries or geographic regions such as maximum or average click rates or the like.

The issuing system 107 also provides affiliates with advertising performance monitoring. Various types of information is monitored, such as recorded impressions, clicks, click rates, number of sales referred, coupon amounts, web addresses to online sites, and any information related to cash card activity, such as total cash cards sold, activated, recharged at the same or different locations from the same or different companies or otherwise recharged online, amount of funds used for recharge, average number of recharges per card, average purchase amount, etc. Further, information may be categorized based on location, region, or types of purchases.

Although a system and method according to the present invention has been described in connection with one or more embodiments including preferred embodiment(s), it is not intended to be limited to the specific form set forth herein, but on the contrary, it is intended to cover such alternatives, modifications, and equivalents, as can be reasonably included within the spirit and scope of the invention as defined by the appended claims.

The invention claimed is:

1. A method of issuing and transacting charge numbers using an electronic communications network, comprising:
receiving, a plurality of valid charge numbers from an issuing bank, wherein each valid charge number is acceptable to any entity that accepts valid charge numbers that are provided to and routed by the charge settlement network for validating transactions;
storing, the plurality of valid charge numbers;
establishing a prepaid cash account for a user in exchange for cash;
detecting a request by a user via the electronic communications network for a valid charge number;
associating one of the plurality of valid charge numbers with the prepaid cash account;
providing, via the electronic communications network, the associated valid charge number in response to the request;
detecting, via the charge settlement network, a purchase transaction using the associated valid charge number between the user and a merchant; and
authorizing the purchase transaction if a cash balance of the prepaid cash account is sufficient for a purchase amount of the purchase transaction.

2. The method of claim 1, wherein providing the associated valid charge number comprises providing the associated valid charge number to the user.

3. The method of claim 2, wherein the detecting a request comprises detecting an online purchase transaction between an online merchant and the user via a computer communications network.

4. The method of claim 1, wherein providing the associated valid charge number comprises providing the associated valid charge number to the user via a telephonic network.

5. The method of claim 1, further comprising:
the detecting a request comprises detecting an online purchase transaction between an online merchant and the user via a computer communications network; and
the providing the associated valid charge number comprises providing the associated valid charge number to the online merchant via the computer communications network.

6. The method of claim 1, further comprising:
expiring the associated one of the plurality of valid charge numbers after being used to consummate the purchase transaction.

7. The method of claim 1, further comprising:
providing a plurality of valid charge numbers via the electronic communications network;
detecting a plurality of provided valid charge numbers used to consummate a corresponding plurality of purchase transactions; and
expiring each of the plurality of provided valid charge numbers after being used to consummate the plurality of purchase transactions.

8. The method of claim 1, further comprising:
clearing, by a merchant, the purchase transaction via a charge settlement network.

9. The method of claim 8, further comprising:
settling, by a merchant processor associated with the merchant, the purchase transaction through the charge settlement network.

10. The method of claim 9, further comprising:
deducting, by the merchant processor, a merchant discount for the merchant.

11. The method of claim 8, further comprising:
routing, by the charge settlement network, the associated one of the plurality of valid charge numbers to a predetermined processor for the plurality of valid charge numbers.

12. The method of claim 11, further comprising:
pre-certifying, by an issuing bank, a valid charge number issuer as the processor for the plurality of valid charge numbers; and
the routing comprising routing the associated one of the plurality of valid charge numbers to the valid charge number issuer.

13. The method of claim 1, wherein the authorizing comprises returning authorization information via the charge settlement network.

14. The method of claim 1, further comprising:
clearing, by a merchant via a charge settlement network, the associated valid charge number employed to consummate the purchase transaction;
routing, by the charge settlement network, purchase transaction information including the associated valid charge number; and
processing the purchase transaction information.

15. The method of claim 14, wherein the processing further comprises:
verifying a charge number received via the charge settlement network with the associated valid charge number.

16. The method of claim 15, further comprising:
generating a valid expiration date corresponding to the associated valid charge number;
providing, via the electronic communications network, the corresponding valid expiration date with the associated valid charge number; and
the processing further comprising verifying an expiration date received via the charge settlement network with the corresponding valid expiration date.

17. The method of claim 14, wherein the processing further comprises:
comparing a purchase amount received via the charge settlement network with a corresponding cash balance.

18. The method of claim 14, further comprising:
authorizing and settling the purchase transaction.

19. The method of claim 14, further comprising:
authorizing and settling a plurality of purchase transactions, each associated with a corresponding one of the plurality of valid charge numbers; and
sending a plurality of settled purchase transactions to a sponsoring bank via an automated clearing house (ACH) batch transfer.

20. The method of claim 19, further comprising:
settling, by the sponsoring bank, the plurality of purchase transactions.

21. The method of claim 1, further comprising:
the detecting of a request comprises detecting an online purchase transaction between an online merchant and the user via a computer communications network; and
establishing an email account that includes communication between the online merchant and the user via the computer communications network.

22. The method of claim 21, further comprising:
generating an email address linked to a prepaid cash account associated with the user; and
providing the email address to the online merchant during the purchase transaction.

23. The method of claim 1, further comprising:
generating a valid expiration date for the associated valid charge number; and
providing, via the electronic communications network, the valid expiration date with the associated valid charge number.

24. A charge number issuing and transaction system for issuing and authorizing valid charge numbers via an electronic communications network, comprising:
a storage device that stores a plurality of valid charge numbers issued by an issuing bank and an accounts database including at least one prepaid cash account associated with the user, wherein each of the plurality of valid charge numbers is acceptable to any entity that accepts valid charge numbers that are provided to a charge settlement network and routed by the charge settlement network for validating transactions;
a network system for coupling to and communicating with the electronic communications network and the charge settlement network; and
an issuing and transaction system, coupled to the storage device and the network system, that detects a request by a user for a charge number via the electronic communications network and that issues a selected one of the plurality of valid charge numbers via the electronic communications network in response to the request, wherein the issuing and transaction system is configured to authorize a purchase transaction submitted for authorization with the selected valid charge number via the charge settlement network if a cash balance in a prepaid cash account associated with the user is sufficient to cover a purchase amount of the purchase transaction.

25. The charge number issuing system of claim 24, wherein the issuing and transaction system provides the selected valid charge number to the user.

26. The charge number issuing system of claim 25, further comprising:
the network system including a telephonic communications system for interfacing a telephonic network; and
the issuing and transaction system providing the selected valid charge number to the user via the telephonic network.

27. The charge number issuing system of claim 24, further comprising:
the network system including a computer communications system for interfacing a computer communications network; and
the issuing and transaction system providing the selected valid charge number to an online merchant via the computer communications network to consummate an online purchase transaction with an online merchant for the user.

28. The charge number issuing system of claim 24, further comprising:
a processor system, coupled to the issuing and transaction system, for coupling to and communicating with the charge settlement network; and
the processor system configured to process transactions utilizing any of the plurality of valid charge numbers entered for clearance via the charge settlement network.

29. The charge number issuing system of claim 28, wherein the issuing and transaction system is configured to verify that a charge number received via the charge settlement network is a selected valid charge number provided via the electronic communications network.

30. The charge number issuing system of claim 28, wherein the charge settlement network comprises an electronic funds transfer (EFT) network.

31. The charge number issuing system of claim 24, further comprising:
the processor system configured to return authorization information via the charge settlement network if the purchase transaction is approved.

32. The charge number issuing system of claim 24, further comprising:
the issuing and transaction system configured to generate a valid expiration date to correspond with the selected valid charge number and to provide the corresponding valid expiration date with the selected valid charge number via the electronic communications network; and
the issuing and transaction system configured to verify that an expiration date received via the charge settlement network is the same as the corresponding valid expiration date.

33. The charge number issuing system of claim 24, further comprising:
the issuing and transaction system expiring the selected valid charge number after authorizing a purchase transaction using the selected valid charge number; and
the storage device storing the expired selected valid charge number in an expired charge number database.

34. The charge number issuing system of claim 24, further comprising:
the issuing and transaction system providing the selected valid charge number to consummate an online transaction between the user and an online merchant; and
an email system, coupled to the issuing and transaction system and the storage device, that includes email communication between the user and the online merchant.

35. The charge number issuing system of claim 34, wherein the email system comprises:
an email processor, coupled to the issuing and transaction system, that generates an email address and that provides the generated email address to the online merchant.

36. The charge number issuing system of claim 35, wherein the email system further comprises:
an email database, stored by the storage device, that further stores generated email addresses.

37. The charge number issuing system of claim 36, further comprising:
the storage device storing an accounts database including at least one prepaid cash account associated with the user; and
the email system associating at least one email address to the at least one prepaid cash account of the user.

38. A charge number issuing and transaction system for issuing valid charge numbers via an electronic communications network and for transacting the valid charge numbers via a charge settlement network, comprising:
an issuing and transaction system, comprising:
a storage device that stores a plurality of valid charge numbers issued by an issuing bank and that stores an accounts database including at least one prepaid cash account, wherein each of the plurality of valid charge numbers is acceptable to any entity that accepts valid charge numbers that are provided to the charge settlement network and routed by the charge settlement network for validating transactions;
a communication system for coupling to and communicating with the electronic communications network and the charge settlement network;
a transaction system, coupled to the storage device and the communication system, that detects requests for charge numbers via the electronic communications network, that provides a selected one of the plurality of valid charge numbers via the electronic communications network in response to the request, and that is configured to authorize a purchase transaction submitted for authorization via the charge settlement network with a selected one of the plurality of valid charge numbers if a cash balance in a prepaid cash account is sufficient to cover a purchase amount of the purchase transaction; and
a processor system, coupled to the transaction system, for coupling to and enabling communications with the charge settlement network; and
a switch network, for coupling to the charge settlement network, that routes any of the plurality of valid charge numbers entered into the charge settlement network to the issuing and transaction system for processing.

39. The charge number issuing and transaction system of claim 38, further comprising:
the storage device storing each valid charge number that has been utilized to consummate a single purchase transaction in an expired charge number database.

40. The charge number issuing and transaction system of claim 38, further comprising:
an email system, coupled to the transaction system and the storage device, that includes email communication with online merchants that conduct online purchase transactions via the electronic communications network.

41. The charge number issuing and transaction system of claim 40, wherein the email system comprises:
   an email processor, coupled to the transaction system, that generates an email addresses; and
   an email database, stored by the storage device, that stores the generated email addresses.

42. The charge number issuing and transaction system of claim 38, further comprising:
   the transaction system generating a valid expiration date to correspond with the selected valid charge number and providing the corresponding valid expiration date with the selected valid charge number via the electronic communications network; and
   the transaction system configured to authorize a purchase transaction submitted for authorization via the charge settlement network if a charge number received by the processing system is the same as the selected valid charge number and if an expiration date received by the processing system is the same as the corresponding valid expiration date.

43. The charge number issuing and transaction system of claim 38, wherein the communication system further comprises:
   a computer network communications system for interfacing a computer communications network; and
   a telephonic communications system for interfacing a telephonic network.

* * * * *